(12) United States Patent
Ajiro

(10) Patent No.: US 8,315,754 B2
(45) Date of Patent: Nov. 20, 2012

(54) VEHICLE BRAKE CONTROLLER

(75) Inventor: Keigo Ajiro, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 450 days.

(21) Appl. No.: 12/694,567

(22) Filed: Jan. 27, 2010

(65) Prior Publication Data

US 2010/0191400 A1    Jul. 29, 2010

(30) Foreign Application Priority Data

Jan. 29, 2009   (JP) .................................. 2009-017890

(51) Int. Cl.
| | |
|---|---|
| *B60L 9/00* | (2006.01) |
| *G06F 7/70* | (2006.01) |
| *G06F 19/00* | (2011.01) |
| *G06G 7/00* | (2006.01) |
| *G06G 7/76* | (2006.01) |

(52) U.S. Cl. .......................................... 701/22; 701/70
(58) Field of Classification Search .................. None
See application file for complete search history.

(56) References Cited

U.S. PATENT DOCUMENTS

| | | | | |
|---|---|---|---|---|
| 3,431,729 | A | * | 3/1969 | Randol ............................ 60/535 |
| 7,146,266 | B2 | * | 12/2006 | Teslak et al. .................... 701/69 |

FOREIGN PATENT DOCUMENTS

JP     2007-112426 A     5/2007

\* cited by examiner

*Primary Examiner* — Paul Danneman
(74) *Attorney, Agent, or Firm* — Young Basile

(57) ABSTRACT

A vehicle brake controller that suppresses variation in deceleration when there is a changeover between regenerative braking torque and frictional braking torque due to regeneration coordination control. A controller performs the function of correcting the assist driving force. More specifically, under regeneration coordination control, the larger the value of change in regenerative braking torque, the smaller the value of change in primary piston becomes with respect to the value of change in input rod stroke.

11 Claims, 14 Drawing Sheets

VEHICLE BRAKE CONTROLLER

CROSS-REFERENCE TO RELATED APPLICATIONS

This application claims priority from Japanese Patent Application Serial No. 2009-017890, filed Jan. 29, 2009, which is incorporated herein in its entirety by reference.

TECHNICAL FIELD

The present invention pertains to a vehicle brake controller

BACKGROUND

Japanese Kokai Patent Application No. 2007-112426 disclosed a brake booster characterized by the fact that the target piston stroke is computed according to the stroke of the input rod that moves forward/backward and is integrated with the brake pedal. The actuator of the booster is driven so that the piston stroke becomes the target piston stroke, and a driving force is applied to the piston.

BRIEF SUMMARY

However, the above-referenced scheme has the following problems. When there is a changeover between regenerative braking torque and frictional braking torque due to regeneration coordination control, the stroke of the input rod varies in conjunction with a change in the master cylinder pressure. Therefore, the deceleration of the vehicle varies.

Embodiments of the invention provide a vehicle brake controller that can limit variation in the deceleration when the regenerative braking torque and the frictional braking torque are swapped due to regeneration coordination control.

According to teachings herein, the displacement of the assist member with respect to the displacement of the input member is decreased when the detected rate of change in the regenerative braking torque increases in the regeneration coordination control operation. Consequently, it is possible to suppress variation in the pressure of the master cylinder when there is a changeover between regenerative braking torque and frictional braking torque due to regeneration coordination control operation, and it is possible to suppress variation in the deceleration.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the following, embodiments of the vehicle brake controller of the invention are explained with reference to the figures.

Embodiment 1

Figure 1:
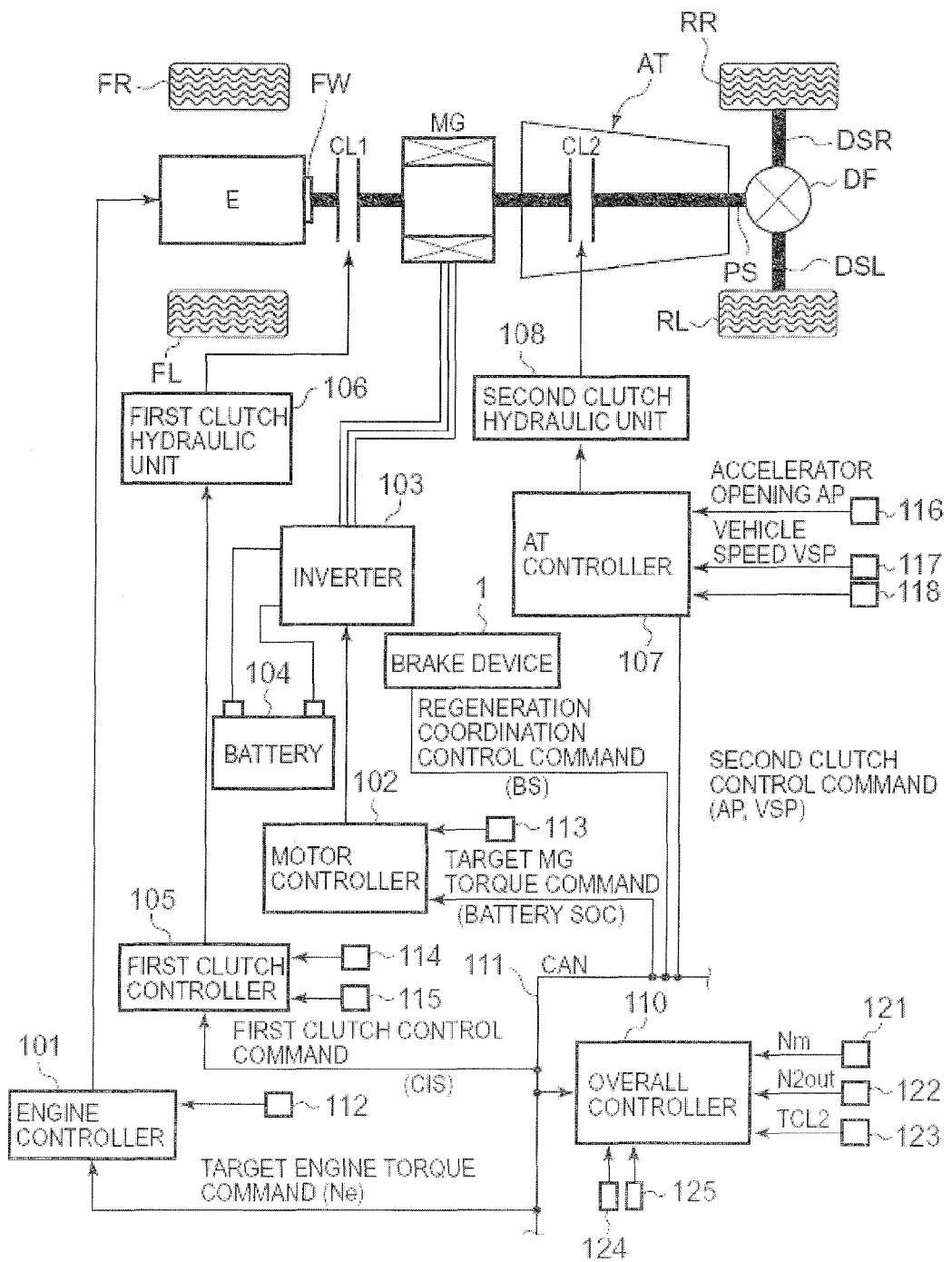
FIG. 1 is a schematic diagram illustrating the overall system of a hybrid vehicle.

As shown in FIG. 1, the drive system of the hybrid vehicle in Embodiment 1 has an engine E, first clutch CL1, motor generator MG (regenerative braking device), second clutch CL2, automatic transmission AT, propeller shaft PS, differential DF, left drive shaft DSL, right drive shaft DSR, rear left wheel RL, rear right wheel RR, front left wheel FL and front right wheel FR.

Engine E can be a gasoline engine, and a throttle valve opening of engine E is controlled based on control commands from engine controller 101. Also, flywheel FW is arranged on an engine output shaft of engine E.

First clutch CL1 is arranged between engine E and motor generator MG, and based on control commands from first clutch controller 105, first clutch CL1 is driven by hydraulic control pressure generated by first hydraulic unit 106 to be engaged/disengaged under control of the control commands. More specifically, when first clutch CL1 is not being controlled, it functions as a normally closed type dry clutch in which clutch plates of first clutch CL1 are fully engaged under a biasing force of a plate spring. When a release command for first clutch CL1 is output by first clutch controller 105, a hydraulic pressure according to a transmission torque capacity command is supplied to a piston to cause the piston to execute a stroke, and the transmission torque capacity is set according to a stroke distance. When a stroke exceeding a prescribed level is performed, contact between the clutch plates is released. To decrease the friction loss in the piston when the clutch is released, the hydraulic pressure applied to the piston is further increased even after contact between the clutch plates ceases, and a prescribed excess stroke distance is provided.

On the other hand, when first clutch CL1 is returned from the disengaged state to the engaged state, the hydraulic pressure applied to the piston is slowly decreased. As a result, the piston starts its stroke, and after the piston reaches a prescribed stroke distance, the clutch plates start to make contact. Here, whether the clutch plates are no longer in contact can be judged by checking whether an engine revolution speed Ne of engine E has started to increase. Then, as the hydraulic pressure acting on the piston decreases, the transmission torque capacity increases.

Motor generator MG is a synchronous type motor generator with permanent magnets embedded in a rotor and with stator coils wound on a stator. Based on a control command from motor controller 102, control is carried out by applying 3-phase AC produced by inverter 103. Motor generator MG can operate as a rotational driving motor when power is supplied from battery 104. When the rotor is driven to rotate by an external force, motor generator MG operates as a generator with electromotive force being generated at the two terminals of the stator coil so that battery 104 is charged. Hereinafter this operating state will be referred to as "regeneration". The rotor of motor generator MG is connected to an input shaft of automatic transmission AT via a damper (not shown).

Second clutch CL2 is provided between motor generator MG and rear left/right wheels RL, RR. Second clutch CL2 is engaged/disengaged by the control commands from AT controller 107 under control by a hydraulic control pressure generated by second clutch hydraulic unit 108.

Automatic transmission AT is a transmission that automatically switches the gear ratio stepwise among five (5) forward speed stages and one (1) reverse speed stage or other settings according to a vehicle speed VSP and accelerator opening AP, etc. Second clutch CL2 is preferably not a dedicated clutch. Instead, second clutch CL2 consists of certain frictional engagement elements among a plurality of frictional engagement elements engaged in the various speed stages of automatic transmission AT.

Here, an output shaft of automatic transmission AT is connected via propeller shaft PS (as the vehicle's drive shaft), differential DF, left drive shaft DSL and right drive shaft DSR to rear left/right wheels RL, RR. Wet multi-plate clutches that allow continuous control of the fluid flow rate and hydraulic pressure by means of proportional solenoids can be used as first clutch CL1 and second clutch CL2.

The hybrid driving system has three drive modes according to the engaged/disengaged state of first clutch CL1.

The first drive mode is the motor-driving drive mode or the electric vehicle drive mode (hereinafter referred to as the EV drive mode) in which the power of motor generator MG alone is used as the power source while first clutch CL1 is disengaged.

The second drive mode is the engine-using vehicle drive mode (hereinafter referred to as the HEV drive mode) in which the vehicle runs with engine E included in the driving power source while first clutch CL1 is engaged.

The third drive mode is the engine-using slip drive mode (hereinafter referred to as the WSC drive mode) in which the vehicle runs with engine E included in the driving power source while first clutch CL1 is engaged and second clutch CL2 is in slip engagement state. This mode is adopted to realize a creep travel state, especially when the SOC (state of charge) of the battery is low or when the engine water temperature is low. When mode transition is made from the EV drive mode to the HEV drive mode, first clutch CL1 is engaged, and the torque of motor generator MG is used to start engine E.

HEV drive mode includes three drive modes, specifically engine drive mode, motor-assisted drive mode, and running electric power generation mode.

In the engine drive mode, engine E alone is used as the power source for driving rear left/right drive wheels RL, RR. In the motor assist drive mode there are two power sources, engine E and motor generator MG, for driving rear left/right drive wheels RL, RR. In the running electric power generation mode, engine E is used as the power source in driving rear left/right wheels RL, RR, while motor generator MG operates as a generator.

In electric constant speed operation and during acceleration, the power of engine E is used to generate power for motor generator MG, which in this mode is used as a generator. Also, during deceleration, regeneration of braking energy is performed to generate electric power by means of motor generator MG for charging battery 104.

As another mode, there is the power generation mode in which the vehicle is stopped, and the power of engine E is used to generate electric power by means of motor generator MG, which is used as a generator.

The control system of the hybrid vehicle is explained in the following.

As shown in FIG. 1, the control system of the hybrid vehicle in Embodiment 1 includes engine controller 101, motor controller 102, inverter 103, battery 104, first clutch controller 105, first clutch hydraulic unit 106, AT controller 107, second clutch hydraulic unit 108, brake device 1 and an overall controller 110 that performs regeneration coordination control (hereinafter called controller 110). Here, engine controller 101, motor controller 102, first clutch controller 105, AT controller 107, brake device 1 and controller 110 are connected via CAN communication line 111 that allows mutual information exchange.

It is to be noted that the operation steps for each controller can be automatically carried out by using a program stored in memory of the controller. For example, each controller, can be a microcomputer including a random access memory (RAM), a read-only memory (ROM) and a central processing unit (CPU) in addition to various input and output connections to receive monitored and/or measured values and to output commands related thereto as dictated by software. The operation steps are performed by execution by the CPU of the program, which is generally a software program stored in ROM. Although the programs are described as being embodied in software, they could be implemented in whole or in part by hardware components. Further, although various controllers are described, the functions could be combined in fewer controllers. In addition, functions of the controllers can be incorporated into one or more standard engine control unit.

Engine controller 101 works as follows. Engine revolution speed information is input from engine revolution speed sensor 112. According to the target engine torque command or the like from controller 110, engine controller 101 outputs commands for controlling engine revolution speed Ne and engine torque Te to the throttle valve actuator (not shown), for example. Also, the information of engine revolution speed Ne, etc., is fed via CAN communication line 111 to controller 110.

Motor controller 102 works as follows. Information is input from resolver 113 that detects the rotational position of the rotor of motor generator MG. According to the target motor generator torque command or the like from controller 110, motor controller 102 outputs commands for controlling revolution speed Nm and torque Tm of motor generator MG to inverter 103. Here motor controller 102 monitors the battery SOC indicating the charging state of battery 104. The battery SOC information is used to control motor generator MG and is also sent via CAN communication line 111 to controller 110.

First clutch controller 105 works as follows. Sensor information is input from first clutch hydraulic pressure sensor 114 and first clutch stroke sensor 115. According to the first clutch control command from controller 110, a command controlling the engagement/disengagement of first clutch CL1 is output to first clutch hydraulic unit 106. Here, information concerning a first clutch stroke CIS is sent via CAN communication line 111 to controller 110.

AT controller 107 works as follows. It receives as input sensor information from accelerator opening sensor 116, vehicle speed sensor 117 and second clutch hydraulic pressure sensor 118, etc. According to the second clutch control command from controller 110, a command controlling the engagement/disengagement of second clutch CL2 is output to second clutch hydraulic unit 108 in the AT hydraulic pressure control valve. Also, information concerning accelerator opening AP and vehicle speed VSP is sent via CAN communication line 111 to controller 110.

Brake device 1 causes frictional braking torque to be applied on each wheel according to operation of the brake by the driver. Also, the frictional braking torque is adjusted based on regeneration coordination control commands from controller 110. Regeneration coordination control will now be explained.

Controller 110 functions to control the overall energy consumption of the vehicle and to operate the vehicle at highest efficiency. Controller 110 receives input sensor information from a motor revolution speed sensor 121 that detects motor revolution speed Nm, a second clutch output revolution speed sensor 122 that detects second clutch output revolution speed N2out, a second clutch torque sensor 123 that detects second clutch transmission torque capacity TCL2 (second clutch torque), a wheel speed sensor 124 that detects the wheel speed of each of the four wheels and G sensor 125 that detects forward/reverse acceleration. Controller 110 also receives as input information obtained via CAN communication line 111.

Controller 110 performs control of the operation of engine E by means of control commands to engine controller 101, the operation of motor generator MG by means of control commands to motor controller 102, the engagement/disengagement of first clutch CL1 by means of control commands to first clutch controller 105, the engagement/disengagement of second clutch CL2 by means of control commands to AT controller 107, and the operation of brake device 1.

Controller 110 computes the target deceleration with respect to a brake pedal depression distance produced by the driver and performs control of the computed target deceleration with the regenerative braking torque being given priority. Such control enables high energy recovery efficiency, and it is possible to realize energy recovery by means of regenerative braking down to a lower vehicle speed.

On the other hand, there is an upper limit to the regenerative braking torque according to the revolution speed determined by the vehicle speed. Consequently, when deceleration due to regenerative braking torque alone is insufficient with respect to the target deceleration, a regeneration coordination control command is output to brake device 1 to compensate for the deficiency.

Figure 2:
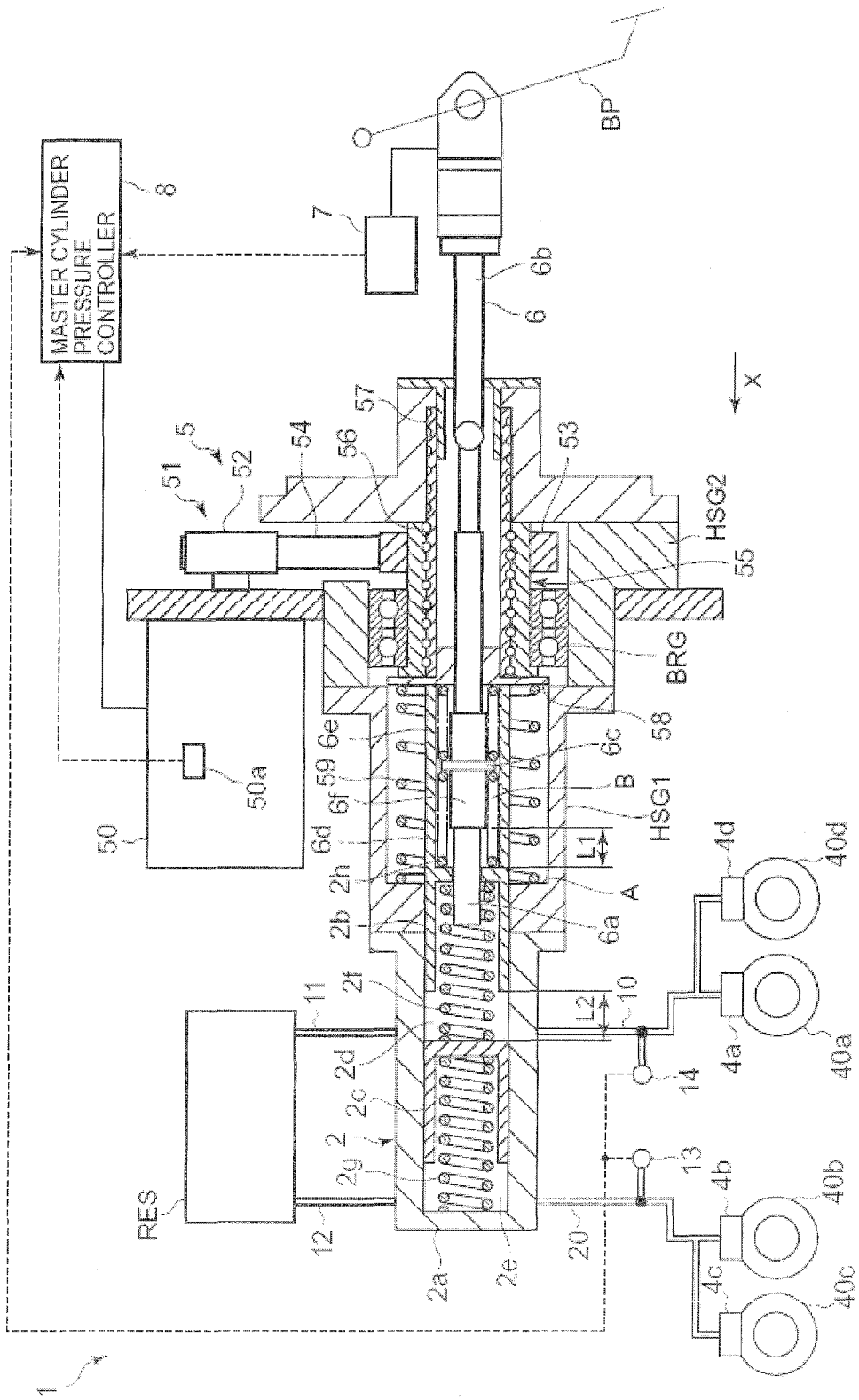
FIG. 2 is a schematic diagram illustrating a brake device.

FIG. 2 is a diagram illustrating brake device 1 in Embodiment 1.

Brake device 1 includes master cylinder 2, reservoir RES, wheel cylinders 4a-4d arranged on the wheels, master cylinder pressure control mechanism (or brake booster) 5 and input rod or member 6 arranged and connected with master cylinder 2, brake pedal depression distance detector 7 and master cylinder pressure controller 8 that controls master cylinder pressure control mechanism 5.

Input rod 6 executes a stroke together with brake pedal BP and adjusts the hydraulic pressure (hereinafter referred to as master cylinder pressure Pmc) in master cylinder 2. Master cylinder pressure control mechanism 5 and master cylinder pressure controller 8 control primary piston (or assist member) 2b of master cylinder 2 to cause a stroke that adjusts master cylinder pressure Pmc.

In order to facilitate explanation in the following, the X-axis is set as the axial direction of master cylinder 2, and the brake pedal BP side is defined as the negative direction. Master cylinder 2 in Embodiment 1 is of the so-called tandem type, and master cylinder 2 comprises primary piston 2b and secondary piston 2c. Primary hydraulic chamber 2d is formed between the inner peripheral surface of master cylinder 2a and the surface on the positive X-axis side of primary piston 2b. Secondary fluid chamber 2e is formed between the inner peripheral surface of master cylinder 2a and the surface on the positive X-axis side of secondary piston 2c.

Primary hydraulic chamber 2d is connected to primary circuit 10, and secondary fluid chamber 2e is connected to secondary circuit 20. The volume of primary hydraulic chamber 2d is changed as primary piston 2b and secondary piston 2c execute a stroke in master cylinder 2a. Return spring 2f is arranged in primary hydraulic chamber 2d to bias primary piston 2b toward the negative side in the X-axis direction. The volume of secondary fluid chamber 2e is changed as secondary piston 2c executes a stroke in master cylinder 2a. Return spring 2g is arranged in secondary fluid chamber 2e to bias secondary piston 2c toward the negative side in the X-axis direction. Also, although not shown in the figure, various types of valves as well as motor pumps, reservoirs, etc., are arranged in primary circuit 10 and secondary circuit 20 for effecting ABS control, etc.

Primary hydraulic pressure sensor 14 is arranged in primary circuit 10, and secondary hydraulic pressure sensor 13 is arranged in secondary circuit 20. Primary hydraulic pressure sensor 14 detects the hydraulic pressure of primary hydraulic chamber 2d, and secondary hydraulic pressure sensor 13 detects the hydraulic pressure of secondary fluid chamber 2e. The hydraulic pressure information is sent to master cylinder pressure controller 8.

One end 6a of input rod 6 on the positive X-axis side passes through the through-hole formed in partition wall 2h of primary piston 2b into primary hydraulic chamber 2d. The one end 6a of input rod 6 and partition wall 2h of primary piston 2b are sealed relative to each other, so that liquid tightness is guaranteed, and the one end 6a is arranged so that it can slide in the X-direction with respect to partition wall 2h. The other end 6b of input rod 6 on the negative X-axis side is connected to brake pedal BP. When the driver depresses brake pedal BP, input rod 6 moves toward the positive X-axis side, and when the foot of the driver is lifted from brake pedal BP, input rod 6 moves toward the negative X-axis side.

Also, large-diameter portion 6f with a diameter larger than the inner periphery (through hole) of partition wall 2h of primary piston 2b and smaller than the outer diameter of flange 6c is formed on input rod 6. Between the end surface on the positive X-axis side of partition wall 2h and the end surface on the negative X-axis side of large-diameter portion 6f, gap L1 is formed when the brake is fully released. By means of gap L1, when a regeneration coordination control command is received from controller 110, primary piston 2b executes a relative movement in the negative X-axis end with respect to input rod 6, so that the frictional braking torque can be decreased according to the regenerative braking torque. Also by means of gap L1, when input rod 6 is relatively displaced by the amount of gap L1 in positive direction of the X-axis end with respect to primary piston 2b, the surface at positive X-axis end of large-diameter portion 6f and partition wall 2h make contact with each other, and input rod 6 and primary piston 2b can move as a unit.

As input rod 6 or primary piston 2b moves in the positive direction of the X-axis, the working fluid in primary hydraulic chamber 2d is pressurized, and the pressurized working fluid is supplied to primary circuit 10. Also, the pressure of primary hydraulic chamber 2d transmitted by the pressurized working fluid drives secondary piston 2c to move in the positive direction of the X-axis. As secondary piston 2c moves in the positive direction of the X-axis, the working fluid in secondary fluid chamber 2e is pressurized, and the pressurized working fluid is supplied to secondary circuit 20.

As explained above, input rod 6 is coupled with brake pedal BP as it moves to apply pressure in primary hydraulic chamber 2d. Consequently, in the event driving motor 50 (booster actuator) of master cylinder pressure control mechanism 5 stops due to malfunction, master cylinder pressure Pmc rises when the driver performs the braking operation (depresses the brake pedal BP), and the prescribed braking torque can be ensured. Also, a force according to master cylinder pressure Pmc is applied to brake pedal BP via input rod 6, and because the reaction force applied to the brake pedal is transmitted to the driver, there is no need to provide a dedicated device for generating a reaction force at the brake pedal. As a result, it is possible to make the brake booster smaller and lighter, with easier installation in the vehicle.

Brake pedal depression distance detector 7 serves to detect the deceleration demanded by the driver, and it is arranged on the side of the other end 6b of input rod 6. Brake pedal depression distance detector 7 is a stroke sensor for detecting the displacement (stroke) of input rod 6 in the direction of the X-axis; that is, it is a stroke sensor for brake pedal BP.

Reservoir RES has at least two fluid chambers separated from each other by a partition wall (not shown in FIG. 2). The fluid chambers can be connected to primary hydraulic chamber 2d and secondary fluid chamber 2e of master cylinder 2 via brake circuits 11, 12, respectively.

Wheel cylinders 4a-4d (frictional braking devices) each have a cylinder, piston, pad, etc. The piston is moved by means of the working fluid supplied by master cylinder 2a. The working fluid presses the pad connected to the piston against the corresponding disk rotor 40a-40d. Here, disk rotors 40a-40d rotate integrally with wheels (FR, FL, RR, RL), and the braking torques acting on disk rotors 40a-40d become the braking forces acting between the various wheels and the road surface, respectively.

Under control commands of master cylinder pressure controller 8, master cylinder pressure control mechanism 5 controls the displacement of primary piston 2b, that is, master cylinder pressure Pmc. Master cylinder pressure control mechanism 5 comprises driving motor 50, speed reducer 51 and rotational/translation movement converter 55. Master cylinder pressure controller 8 is an arithmetic and logic operation circuit, and the operation of driving motor 50 is controlled based on the sensor signals, etc., from brake pedal depression distance detector 7 and driving motor 50.

The constitution and operation of master cylinder pressure control mechanism 5 will be explained in the following.

Here, driving motor 50 is a 3-phase DC brushless motor, and it is operated by the electric power supplied based on control commands of master cylinder pressure controller 8 so that the desired rotational torque is generated.

Speed reducer 51 reduces the rotational speed of output of the driving motor 50 by means of a pulley reduction system. Speed reducer 51 has a small diameter driving-side pulley 52 arranged on the output shaft of driving motor 50, a large diameter driven-side pulley 53 arranged on ball screw nut 56 of rotational/translation movement converter 55 and a belt 54 suspended between pulleys 52, 53. Speed reducer 51 amplifies the rotational torque of driving motor 50 according to the reduction ratio (the ratio of the radius of driving-side pulley 52 to that of driven-side pulley 53), and the amplified rotational torque is transmitted to rotational/translation movement converter 55.

Rotational/translation movement converter 55 converts the rotational power of driving motor 50 into the translational movement power, and this translational movement power presses primary piston 2b. In Embodiment 1, the ball screw system is adopted as the power conversion mechanism, and rotational/translation movement converter 55 has a ball screw nut 56, a ball screw shaft 57, a movable member 58 and return spring 59.

First housing member HSG1 is connected at its negative X-axis end to master cylinder 2, and second housing member HSG2 is connected at its negative X-axis end to first housing member HSG1. Ball screw nut 56 is arranged in an axially rotatable way on the inner periphery of bearing BRG in second housing member HSG2. Driven side pulley 53 is fitted on the outer periphery of ball screw nut 56 at its negative X-axis end. Ball screw shaft 57 is threaded into the inner periphery of ball screw nut 56. A plurality of ball bearings is rotatably arranged in the gaps between ball screw nut 56 and ball screw shaft 57.

Movable member 58 is integrally formed on ball screw shaft 57 at its positive X-axis end, and primary piston 2b joins the surface of movable member 58 at its positive X-axis end. Primary piston 2b is accommodated in first housing member HSG1, and the positive X-axis end of primary piston 2b projects from first housing member HSG1 and fits the inner periphery of master cylinder 2.

Return spring 59 is arranged in first housing member HSG1 on the outer periphery of primary piston 2b. The positive X-axis end of return spring 59 is anchored to surface A at positive X-axis end inside first housing member HSG1, and the negative X-axis end is engaged with movable member 58. Return spring 59 is arranged compressed in the X-direction between surface A and movable member 58, so that movable member 58 and ball screw shaft 57 are biased toward the negative X-axis side.

Ball screw nut 56 rotates integrally with driven-side pulley 53. The rotating movement of ball screw nut 56 causes ball screw shaft 57 to move translationally in the X-direction. Due to the driving force of the translational movement of ball screw shaft 57 toward the positive X-axis side, primary piston 2b is pressed via movable member 58 toward the positive X-axis side. Here, FIG. 1 shows the state in which ball screw shaft 57 is at the initial position maximally displaced toward the negative X-axis side when the brake is not in operation (i.e., brake pedal BP is fully released).

On the other hand, the elastic force of return spring 59 acts on ball screw shaft 57 in the opposite direction (toward the negative X-axis side) with respect to the driving force in the positive X-axis direction. As a result, when primary piston 2b is pressed in positive X-axis direction, and master cylinder pressure Pmc is applied, in the event that a malfunction causes driving motor 50 to stop so that it is impossible to apply control to return ball screw shaft 57, ball screw shaft 27 can still be returned to the initial position by means of the reactive force of return spring 59. As a result, master cylinder pressure Pmc decreases to near zero, so that variation in braking force drag can be prevented and instability in the behavior of the vehicle caused by the braking force drag can be avoided.

A pair of springs 6d, 6e (according to the biasing members) are arranged in the annular ring-shaped space B formed between input rod 6 and primary piston 2b. Each of the pair of springs 6d, 6e has one end engaged with flange 6c provided on input rod 6. The other end of spring 6d engages with partition wall 2h of primary piston 2b, while the other end of spring 6e engages with movable member 58. The pair of springs 6d, 6e has the following function. Input rod 6 is biased with respect to primary piston 2b toward the central portion of the relative displacement between the two members, and when brake operation is fully released, input rod 6 and primary piston 2b are kept at the neutral position of the relative movement. By means of the pair of springs 6d, 6e, when input rod 6 and primary piston 2b are relatively displaced from the neutral position in any direction, a biasing force acts so that input rod 6 returns to the neutral position with respect to primary piston 2b.

A resolver or other rotational angle detection sensor 50a is arranged on driving motor 50. As a result, the position signal for the motor output shaft resulting from the detection mentioned previously is input to master cylinder pressure controller 8. Based on the input position signal, master cylinder pressure controller 8 computes the rotational angle of driving motor 50. Based on the rotational angle, the driving force distance of rotational/translation movement converter 25, that is, the displacement of primary piston 2b in the X-direction, is computed.

In the following, the operation of amplifying the driving force of input rod 6 by means of master cylinder pressure control mechanism 5 and master cylinder pressure controller 8 will be explained. In Embodiment 1, according to the displacement of input rod 6, master cylinder pressure controller 8 controls displacement of primary piston 2b, that is, the relative displacement between 6 and primary piston 2b, by means of driving motor 50.

According to the target deceleration determined by the displacement of input rod 6 when the driver depresses the brake pedal, master cylinder pressure control mechanism 5 and master cylinder pressure controller 8 operate to provide displacement of primary piston 2b. As a result, in addition to the driving force of input rod 6, the driving force of primary piston 2b is also applied to primary hydraulic chamber 2d, so that master cylinder pressure Pmc is adjusted. That is, the driving force of input rod 6 is amplified. The amplification ratio (hereinafter to be referred to as boost ratio α) is determined as follows from the cross-sectional area of input rod 6 and of primary piston 2b in the direction perpendicular to the axis in primary hydraulic chamber 2d (hereinafter referred to as pressure receiving areas AIR and APP).

Adjustment of the hydraulic pressure of master cylinder pressure Pmc is carried out based on the pressure equilibrium relationship represented by Equation (1):

$$Pmc=(FIR+K\times\Delta x)/AIR=(FPP-K\times\Delta x)/APP; \text{ wherein} \quad (1)$$

Pmc: Hydraulic pressure of primary hydraulic chamber 2d (master cylinder pressure);
FIR: Driving force of input rod 6;
FPP: Driving force of primary piston 2b;
AIR: Pressure receiving area of input rod 6;
APP: Pressure receiving area of primary piston 2b;
K: Spring constant of springs 6d, 6e; and
Δx: Relative displacement between input rod 6 and primary piston 2b.

In Embodiment 1, pressure receiving area AIR of input rod 6 is set to be smaller than pressure receiving area APP of primary piston 2b.

Here, assuming the displacement of input rod 6 (e.g. an input rod stroke) is Xi, and the displacement of primary piston 2b (piston stroke) is Xb, relative displacement Δx is defined as Δx=Xb−Xi. Consequently, for Δx, the neutral position of the relative movement is defined as 0, the direction of forward movement (a stroke in positive X-axis direction) of primary piston 2b relative to input rod 6 is defined as positive, and the opposite direction is defined as negative. The sliding resistance of the seal is ignored in pressure equilibrium Equation (1). Driving force FPP of primary piston 2b can be estimated from the electric current value for driving motor 50.

On the other hand, boost ratio α can be represented by Equation (2):

$$\alpha=Pmc\times(APP+AIR)/FIR. \quad (2)$$

Consequently, when Pmc in Equation (1) is substituted into Equation (2), boost ratio α is provided by the Equation (3):

$$\alpha=(1+K\times Pmc\times\Delta x)/FIR\times(AIR+APP)/AIR. \quad (3)$$

In the boost control, driving motor 50 (with piston stroke Xb) is controlled so that the target master cylinder pressure characteristics are obtained. Here the master cylinder pressure characteristics refer to the characteristics of change in master cylinder pressure Pmc with respect to input rod stroke Xi. By having the stroke characteristics indicating piston stroke Xb with respect to input rod stroke Xi correspond to the target master cylinder pressure characteristics, it is possible to obtain the characteristics for computing the target displacement indicating change in the relative displacement Δx with respect to input rod stroke Xi. Based on the target displacement computing characteristics obtained by inspection, the target value of relative displacement Δx (hereinafter to be referred to as target displacement Δx*) is computed.

That is, the target displacement computing characteristics indicate the characteristics of change in target displacement Δx* with respect to input rod stroke Xi, and a target displacement Δx* corresponding to input rod stroke Xi is determined. When the rotation of driving motor 50 (displacement Xb of primary piston 2b) is controlled so that target displacement Δx*, determined corresponding to detected input rod stroke Xi, is realized, master cylinder pressure Pmc with a magnitude corresponding to target displacement Δx* is generated by master cylinder 2.

Here, input rod stroke Xi is detected by brake pedal depression distance detector 7 as explained above, piston stroke Xb is computed based on the signal of rotational angle detection sensor 50a, and relative displacement Δx can be determined from the difference between the detected (or computed) displacements. More specifically, in the boost control, target displacement Δx* is set based on detected displacement Xi and the target displacement computing characteristics, and driving motor 50 is controlled (feedback control) so that detected (computed) relative displacement Δx matches target displacement Δx*. A scheme can also be adopted in which a stroke sensor for detecting piston stroke Xb is provided separately.

In Embodiment 1, by performing boost control without using a force sensor on the pedal, the cost can be cut accordingly. Also, by controlling driving motor 50 so that relative displacement Δx becomes any prescribed value, it is possible to obtain a boost ratio larger or smaller than the boost ratio defined by the pressure receiving area ratio (AIR+APP)/AIR, and it is possible to obtain a braking force based on the desired boost ratio.

The constant boost control of driving motor 50 is carried out so that input rod 6 and primary piston 2b are integrally displaced, that is, displaced with primary piston 2b always assuming the neutral position with respect to input rod 6, and with relative displacement Δx=0. When primary piston 2b makes a stroke such that Δx=0, boost ratio α is uniquely defined as α=(AIR+APP)/AIR) according to Equation (3). Consequently, by setting AIR and APP based on the necessary boost ratio and controlling primary piston 2b so that displacement Xb becomes equal to input rod stroke Xi, it is possible to obtain a constant (necessary) boost ratio at all times.

With respect to the target master cylinder pressure characteristics in the constant boost control, master cylinder pressure Pmc generated in conjunction with the forward movement of input rod 6 (displacement in positive direction of the X-axis) increases as a quadratic curve, cubic curve or a multi-order curve formed as a composition of even higher-order curves than the quadratic curve or the cubic curve (hereinafter to be referred to as multi-order curve). Also, the constant boost control has stroke characteristics in which primary piston 2b makes a stroke for the same distance as that for input rod stroke Xi (Xb=Xi). According to the target displacement computing characteristics obtained based on the stroke characteristics and the target master cylinder pressure characteristics, target displacement Δx* becomes 0 for any input rod stroke Xi.

On the other hand, in a variable boost control, target displacement Δx* is set at a positive prescribed value, and driving motor 50 is controlled so that relative displacement Δx becomes the same as the prescribed value. As a result, as input rod 6 is driven to move forward in the direction of increasing master cylinder pressure Pmc, displacement Xb of primary piston 2b becomes larger than input rod stroke Xi. According to Equation (3), the magnitude of boost ratio α is increased by (1+K×Δx/FIR) times. That is, it becomes identical to the case in which primary piston 2b is driven to execute a stroke by a distance obtained by multiplying input rod stroke Xi by the proportional gain (1+K×Δx/FIR). In this way, boost ratio α can be adjusted according to relative displacement Δx. Master cylinder pressure control mechanism 5 serves as the boosting source, and a braking torque required by the driver is generated with a significantly decreased pressing force on the brake pedal.

That is, from the standpoint of control properties, it is preferred that the proportional gain (1+K×Δx/FIR) has the value 1. However, for example, in case of emergency braking or the like when the driver wants to apply a braking torque with an increased brake pedal depression distance, it is possible to temporarily change the proportional gain to a value greater than 1. As a result, it is possible even with the same brake pedal depression distance to increase master cylinder pressure Pmc above that in the normal case (when the proportional gain is 1). Consequently, it is possible to generate a larger braking torque. Here, judgment as to whether emergency braking should be applied can be effected by judging whether the time rate of change of the signal from brake pedal depression distance detector 7 exceeds a prescribed level.

In this way, in variable boost control, the forward movement of primary piston 2b is made greater than the forward movement of input rod 6 (Xb>Xi), the relative displacement Δx of primary piston 2b with respect to input rod 6 increases as input rod 6 moves forward, and driving motor 50 is controlled so that the increase in master cylinder pressure Pmc in conjunction with the increased forward movement relative to the forward movement of input rod 6 becomes greater than that in constant boost control.

With regard to the target master cylinder pressure characteristics in variable boost control, the increase in master cylinder pressure Pmc generated in conjunction with forward movement of input rod 6 (displacement in the positive direction X-axis) is greater than that in the constant boost control (the master cylinder pressure characteristic that increases in the form of a multi-order curve becomes steeper). Also, the variable boost control has stroke characteristics in which the increase in piston stroke Xb with respect to an increase in input rod stroke Xi is greater than 1. According to the target displacement computing characteristics obtained based on the stroke characteristics and the target master cylinder pressure characteristics, target displacement Δx* increases at a prescribed ratio with respect to an increase in input rod stroke Xi.

Also, in addition to this control, a control scheme can also be adopted for the variable boost control in which driving motor 50 is controlled so that piston stroke Xb becomes smaller than input rod stroke Xi as input rod 6 moves in the direction of an increase in master cylinder pressure Pmc. As a result, it is possible under regeneration coordination control to decrease the frictional braking torque according to an increase in the regenerative braking torque.

Figure 3:
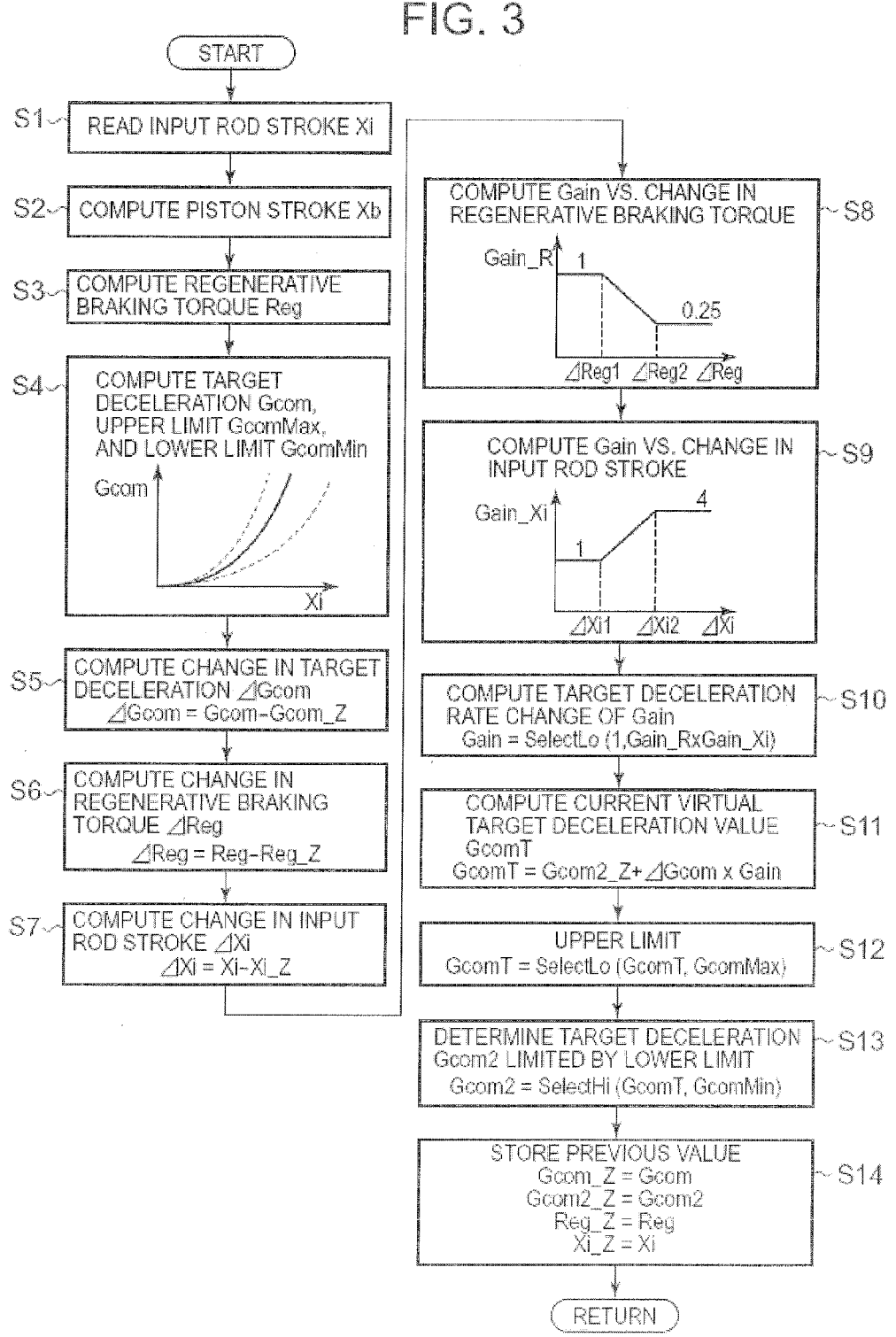
FIG. 3 is a flow chart illustrating the processing for computing the target deceleration in an regeneration coordination control operation executed by an overall controller in Embodiment 1.

FIG. 3 is a flow chart illustrating the processing involved in the target deceleration computation during regeneration coordination control executed by controller 110. The various processing steps will be explained in the following. Here, the processing is executed repeatedly in a prescribed periodic arithmetic and logic operation cycle.

In step S1, the input rod stroke Xi detected by brake pedal depression distance detector 7 is read, and processing then goes to step S2.

In step S2, piston stroke Xb is computed from the rotational angle of driving motor 50 detected using rotational angle detection sensor 50a, and processing then goes to step S3.

In step S3, based on the vehicle speed computed from the various wheel speeds obtained using wheel speed sensors 124, the maximum regenerative braking torque Reg that can be generated is computed, and processing then goes to step S4.

In step S4, based on input rod stroke Xi, the target vehicle deceleration Gcom is computed, and processing then goes to step S5. Here, target deceleration Gcom has the characteristic feature that it increases as input rod stroke Xi is increased. Also, upper limit GcomMax and lower limit GcomMin are set for target deceleration Gcom.

In step S5, the value Gcom_Z of target deceleration Gcom in the last cycle (the value of target deceleration Gcom in the last cycle that was acquired and stored in the last cycle of arithmetic and logic operation) is subtracted from target deceleration Gcom to obtain the change in target deceleration ΔGcom, and processing then goes to step S6.

In step S6, the last-cycle value Reg_Z of regenerative braking torque Reg is subtracted from regenerative braking torque Reg to compute the change in regenerative braking torque ΔReg (according to regenerative braking torque change rate detection means), and processing then goes to step S7.

In step S7, last-cycle value Xi_Z of input rod stroke Xi is subtracted from input rod stroke Xi to compute the change in input rod stroke ΔXi (according to the pedal stroke speed detection means), and processing then goes to step S8.

In step S8, gain Gain_R with respect to the change in regenerative braking torque ΔReg is computed to perform a function of assist driving force correction, and processing then goes to step S9. The setting map for Gain_R with respect to change in regenerative braking torque ΔReg is shown in FIG. 3. Gain_R is taken as 1 when ΔReg is smaller than a prescribed value ΔReg1. When ΔReg exceeds prescribed value ΔReg1 but is below prescribed value ΔReg2, the gain decreases as ΔReg increases, and when ΔReg exceeds prescribed value ΔReg2, ΔReg is taken as 0.25.

In step S9, gain Gain_X with respect to the change in input rod stroke ΔXi is computed, and processing then goes to step S10. The setting map for Gain_Xi with respect to ΔXi is shown in FIG. 3. Gain_Xi is taken as 1 when ΔXi is smaller than a prescribed value ΔXi1. When ΔXi is between prescribed value ΔXi1 and prescribed value ΔXi2, gain_Xi increases as ΔXi increases, and when ΔXi exceeds prescribed value ΔXi2, gain_Xi is taken as 4.

In step S10, the product of Gain_R and Gain_Xi is compared to 1. The smaller of these is computed as the rate of change Gain in the target deceleration according to Gain=SelectLo(1, Gain_R×Gain_Xi), and processing then goes to step S11.

In step S11, the value obtained by multiplying the target deceleration rate of change Gain with the change in target deceleration rate ΔGcom is added to the last-cycle value Gcom2_Z of corrected target deceleration Gcom2 to calculate the current-cycle virtual value of the target deceleration GcomT according to GcomT=Gcom2_Z+ΔGcom×Gain, and processing then goes to step S12.

In step S12, the smaller value of the current-cycle virtual value of the target deceleration GcomT and upper limit GcomMax of the target deceleration is taken as the current-cycle virtual value of the target deceleration GcomT according to GcomT=SelectLo(GcomT, GcomMax), and processing goes to step S13.

In step S13, the larger value of current-cycle virtual value of the target deceleration GcomT and the lower limit GcomMin of the target deceleration is taken as the corrected target deceleration Gcom2 according to Gcom2=SelectHi(GcomT, GcomMin), and processing then goes to step S14.

In step S14, the values of Gcom, Gcom2, Reg, and Xi acquired or computed in the current periodic cycle of arithmetic and logic operation are stored as the last-cycle values, and flow then goes to Return.

By means of controller 110, the deceleration effected by regenerative braking torque Reg is subtracted from corrected target deceleration Gcom2 determined in the above processing to compute the deceleration to be effected by the frictional braking torque, and the regeneration coordination control command is output to brake device 1. Master cylinder pressure controller 8 of brake device 1 controls piston stroke Xb of master cylinder pressure control mechanism 5 to obtain the deceleration to be effected by the frictional braking torque.

Figure 4:
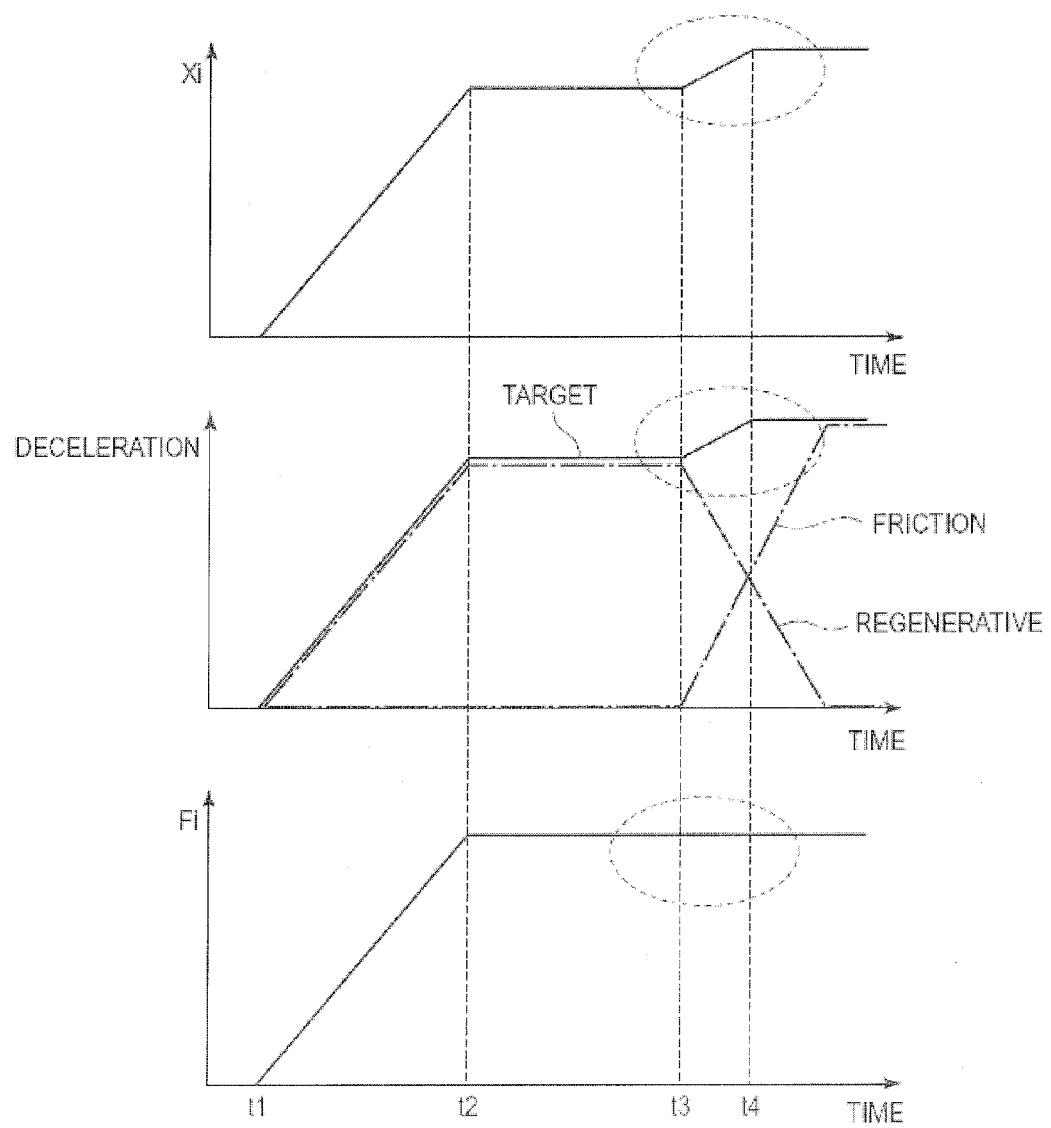
FIG. 4 is a time chart illustrating variation in the target deceleration when there is a changeover from regenerative braking torque to frictional braking torque during deceleration of the vehicle.

FIG. 4 is a time chart illustrating the change in target deceleration when regenerative braking torque is switched to frictional braking torque while a vehicle is being decelerated in the absence of correcting target deceleration as described in Embodiment 1.

At time t1, the driver starts depressing brake pedal BP, and at time t2, the pedal stroke is held constant. According to the pressure equilibrium equation of Equation (1), when the pedal stroke is constant, brake depression force Fi of the driver can be represented by Equation (4):

$$Fi = Pmc \times AIR + K \times \Delta x. \quad (4)$$

From Equation (4) it can be seen that brake depression force Fi is determined from master cylinder pressure Pmc and the reaction forces of springs 6d, 6e.

At time t3, because the vehicle has been decelerating and the vehicle speed is approaching the level at which regeneration is impossible, the deceleration by the regenerative braking torque is changed over to deceleration by the frictional braking torque while the deceleration of the vehicle is kept constant. In this case, master cylinder pressure control mechanism 5 controls piston stroke Xb to increase master cylinder pressure Pmc so that the frictional braking torque is increased according to the decrease in the regenerative braking torque.

Here, when master cylinder pressure Pmc is increased, although the driver holds the stroke constant at brake pedal BP, Pmc×AIR on the right hand side of Equation (4) is increased, and the brake depression force Fi is increased. Consequently, it is ideal for piston stroke Xb to be controlled so that K×Δx is decreased according to the increase in Pmc×AIR. That is, piston stroke Xb should be such that brake depression force Fi is kept constant.

While the relationship between piston stroke Xb and master cylinder pressure Pmc has nonlinear characteristics, the relationship between piston stroke Xb and the reaction forces of springs 6d, 6e has linear characteristics. Consequently, after control of piston stroke Xb, variation in brake depression force Fi, or in other words, variation in the reactive force acting on the brake pedal (decreased reactive force), is inevitable. Because the driver depresses the accelerator pedal with a constant depression force, the pedal stroke changes as the reactive force decreases (time t3 to t4). In this embodiment, a case in which the brake pedal stroke is increased is shown as an example. As shown in step S4, when the pedal stroke changes, that is, when input rod stroke Xi changes, target deceleration Gcom becomes a larger value. If gain correction is not performed as in step S8 shown in FIG. 3, although the driver desires a constant deceleration and depresses the brake pedal with a constant depression force, the deceleration increases according to the change in pedal stroke. Consequently, when a changeover between regenerative braking torque and the frictional braking torque occurs, although the driver maintains a constant depression force on brake pedal BP, the target deceleration increases (time t3 to t4). Consequently, although not intended by the driver, an increase in the deceleration takes place.

On the other hand, in the case of regeneration coordination control in Embodiment 1, the greater the change in regenerative braking torque ΔReg, the smaller the gain Gain_R with respect to change in regenerative braking torque ΔReg. Consequently, the larger the value of change in regenerative braking torque ΔReg, the smaller the value of corrected target deceleration Gcom2 becomes.

Figure 5:
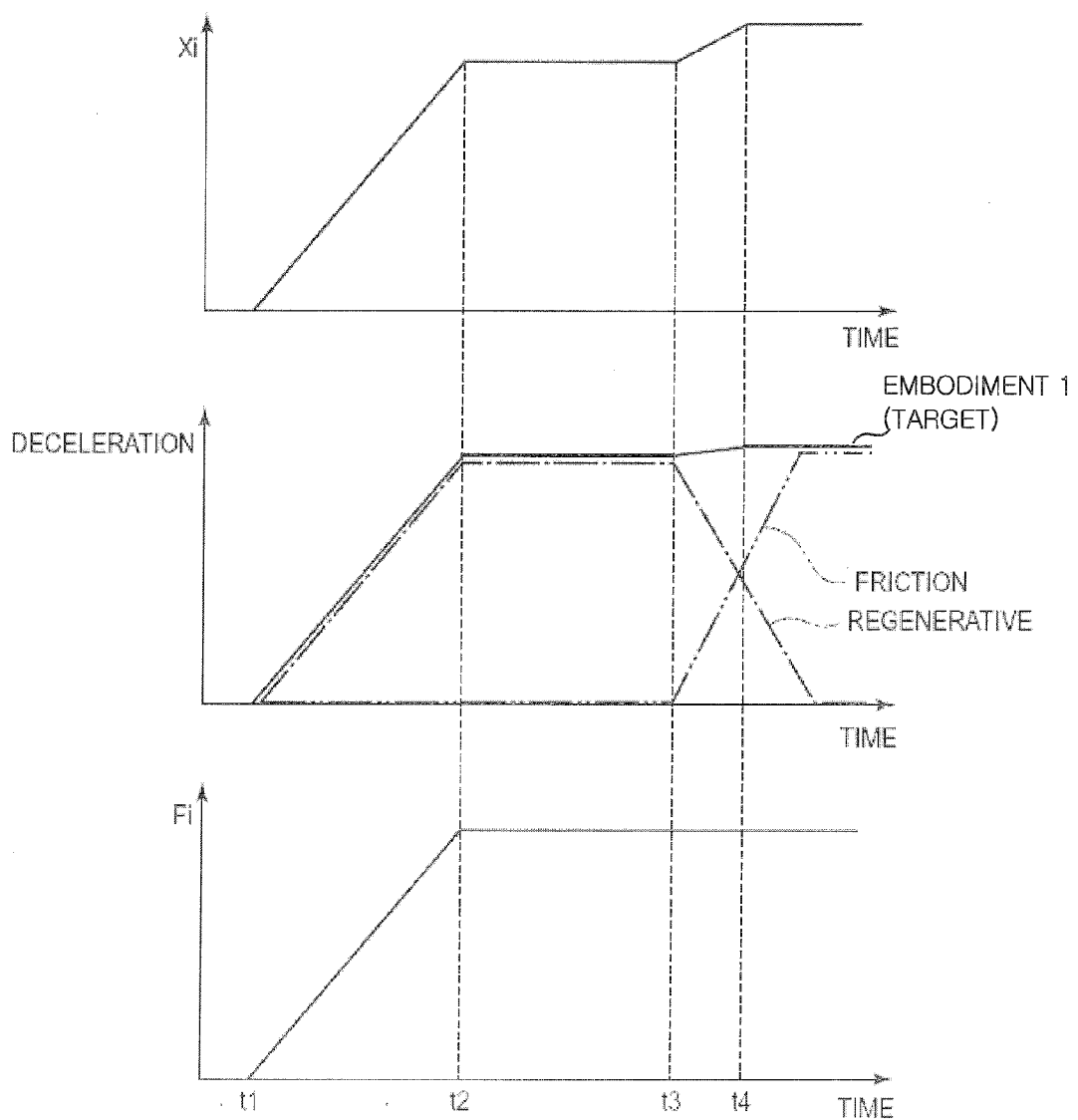
FIG. 5 is a time chart illustrating the operation of correcting the target deceleration according to the amount of change in the regenerative braking torque in Embodiment 1.

That is, in Embodiment 1, the higher the rate of change of regenerative braking torque Reg, the smaller the value of piston stroke Xb is with respect to input rod stroke Xi. Consequently, as shown in FIG. 5, it is possible to suppress variation in master cylinder pressure Pmc when deceleration due to regenerative braking torque is changed over to deceleration due to the frictional braking torque at time t3. Compared to the case when this control is not carried out, variation in the target deceleration and increased deceleration unintended by the driver can be suppressed.

Depending on the relationship between the piston stroke, master cylinder pressure Pmc and the reaction forces of springs 6d, 6e, the pedal stroke of the brake pedal may decrease. In this case, the same effect can be realized by performing a correction opposite that of the present embodiment.

Also, in the case of regeneration coordination control in Embodiment 1, the larger the value of change in input rod stroke ΔXi, the larger the value of Gain_Xi becomes with respect to a change in input rod stroke ΔXi. Consequently, the larger the value of change in input rod stroke ΔXi, the larger the value of corrected target deceleration Gcom2.

Figure 6:
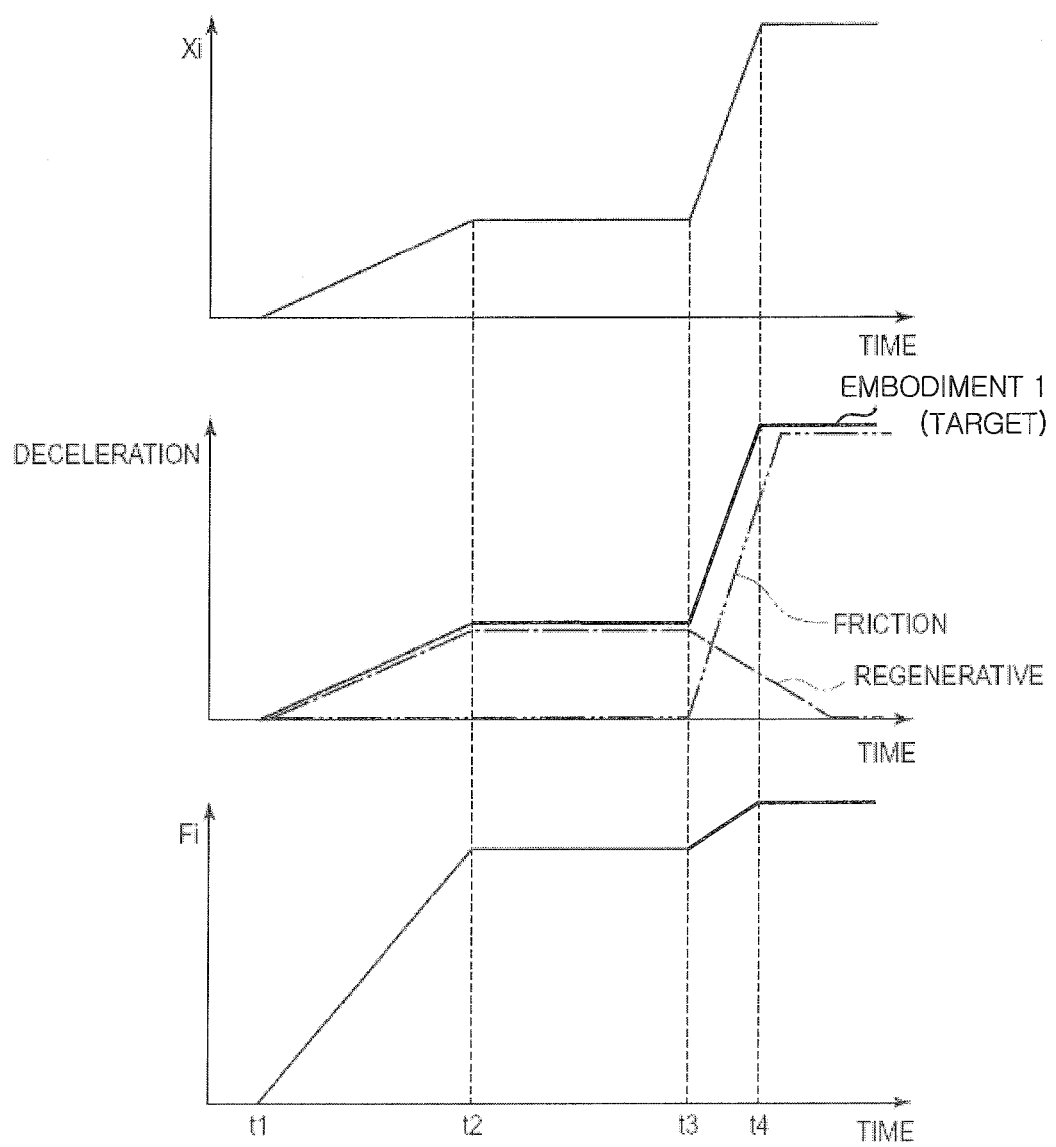
FIG. 6 is a time chart illustrating the operation of correcting the target deceleration according to the amount of change in the input rod stroke in Embodiment 1.

That is, in Embodiment 1, when the stroke speed of brake pedal BP is higher, the change in piston stroke Xb with respect to the change in input rod stroke Xi is greater. Consequently, as shown in FIG. 6, when deceleration due to the regenerative braking torque is changed over to deceleration due to the frictional braking torque at time t3, if the driver depresses brake pedal BP farther, it is possible to increase the target deceleration with respect to driver demand upon an increase in the deceleration.

For example, when the driver rapidly depresses brake pedal BP (such as in emergency braking or the like), if the change in target deceleration according to the change in the brake pedal BP stroke is small, there would be a feeling of sluggish response. Here, by increasing the change in piston stroke Xb with respect to the change in input rod stroke Xi when the stroke speed of brake pedal BP is high, it is possible to match deceleration of the vehicle to driver demand for a change in the deceleration without delay.

In Embodiment 1, corrected target deceleration virtual value GcomT of the current round is determined by correcting target deceleration Gcom based on Gain_R with respect to a change in regenerative braking torque ΔReg and Gain_Xi with respect to a change in input rod stroke ΔXi. Corrected target deceleration virtual value GcomT is then compared to upper limit GcomMax of the target deceleration and lower limit GcomMin of the target deceleration to determine corrected target deceleration Gcom2.

As a result, it is possible to prevent setting an excessively large corrected target deceleration Gcom2 when the change in regenerative braking torque ΔReg is large, and it is possible to prevent setting too small of a corrected target deceleration Gcom2 when change in input rod stroke ΔXi is large.

The effects that can be realized by the vehicle brake controller in Embodiment 1 are described in the following.

(1) The vehicle brake controller includes input rod 6 that moves forward/backward when brake pedal BP is depressed/released, primary piston 2b arranged so that it can move relative to the movement direction of input rod 6, springs 6d, 6e that bias input rod 6 toward the neutral position with respect to primary piston 2b for relative displacement between the two parts and driving motor 50 that drives primary piston 2b to move forward/backward according to input rod stroke Xi. There are also master cylinder pressure control mechanism 5 that generates the thrust force for boosting the force of primary piston 2b for pressurizing the brake fluid in the master cylinder, wheel cylinders 4a-4d for applying frictional braking torque to each wheel according to the master cylinder pressure, motor generator MG for applying the regenerative braking torque to each wheel, a regenerative braking torque change rate detector for detecting change ΔReg in regenerative braking torque as the rate of change in the regenerative braking torque (step S6), controller 110 for executing regeneration coordination control of the frictional braking torque and the regenerative braking torque so that the total braking torque, including the frictional braking torque and the regenerative braking torque, becomes the braking torque demanded by the driver and an assist driving force corrector (step S8). The assist driving force corrector works as follows. In the regeneration coordination control operation, the larger the value of change in regenerative braking torque ΔReg, the smaller the value of change in primary piston 2b becomes with respect to the change in input rod stroke Xi. As a result, when there is a changeover between regenerative braking torque and frictional braking torque, it is possible to suppress variation in master cylinder pressure Pmc and variation in the deceleration. (2) The vehicle brake controller has a pedal stroke speed detector (step S7) for detecting change in input rod stroke ΔXi. The assist driving force corrector works as follows. The larger the value of change in input rod stroke ΔXi, the larger the value of change in primary piston 2b becomes with respect to the change in input rod stroke Xi. As a result, it is possible to match deceleration of the vehicle to the change in deceleration demanded by the driver.

Embodiment 2

The vehicle brake controller in Embodiment 2 differs from Embodiment 1 only with regard to the judgment as to whether regeneration coordination control can be started. Consequently, many of the steps used in Embodiment 1 are adopted in Embodiment 2, so explanation of those steps will be omitted for the sake of brevity.

Figure 7:
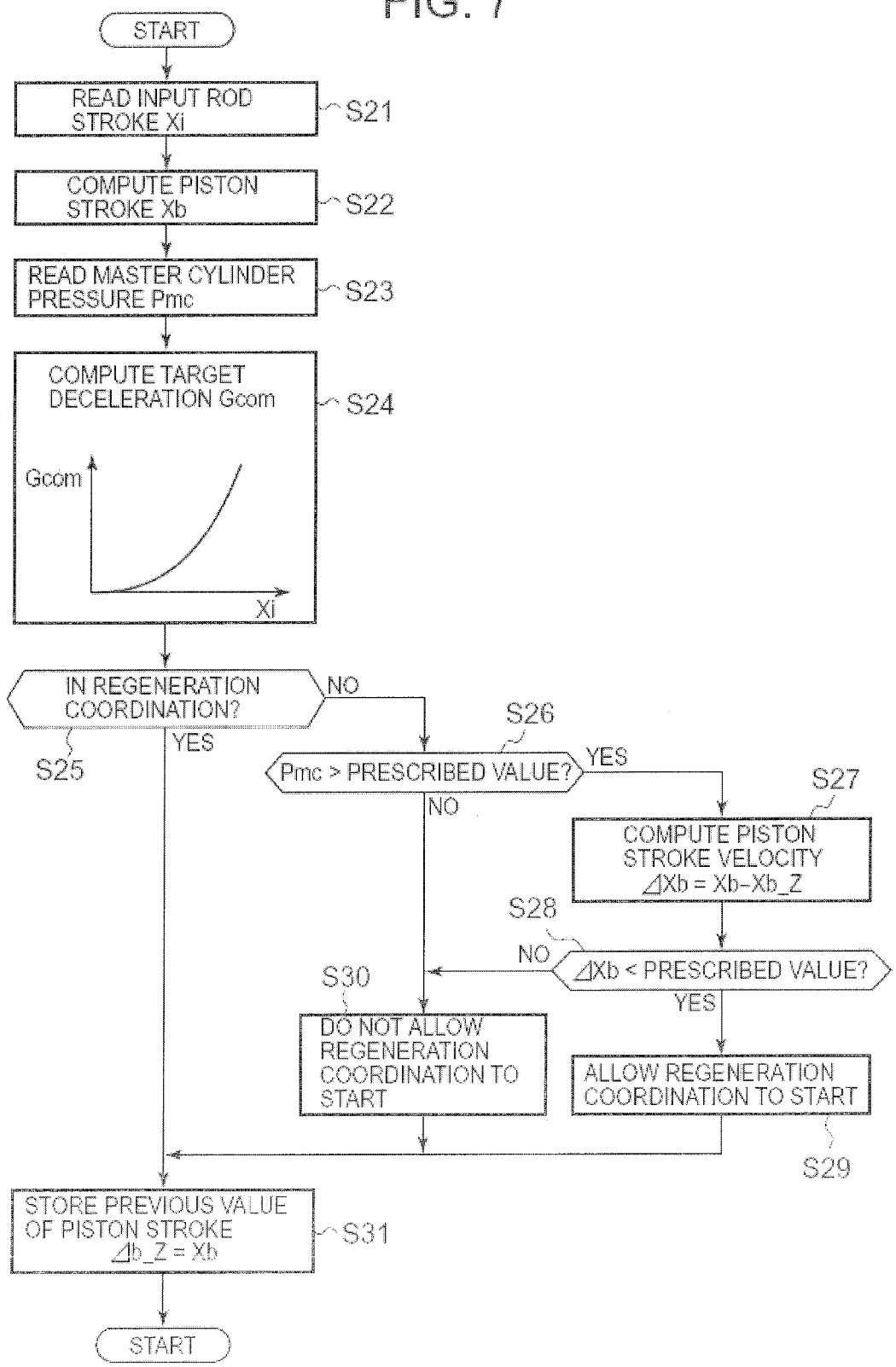
FIG. 7 is a flow chart illustrating the processing for judging whether regeneration coordination control can be executed by an overall controller in Embodiment 2.

FIG. 7 is a flow chart illustrating the judgment processing as to whether regeneration coordination control can be carried out that is executed by controller 110 in Embodiment 2. The various processing steps will be explained in the following. Here, the processing is executed repeatedly at a prescribed periodic cycle of arithmetic and logic operation.

In step S21, input rod stroke Xi detected with brake pedal depression distance detector 7 is read (according to the input member movement speed detector), and processing then goes to step S22.

In step S22, piston stroke Xb is computed from the rotational angle of driving motor 50 detected with rotational angle detection sensor 50a, and processing then goes to step S23.

In step S23, the values of master cylinder pressure Pmc read by primary hydraulic pressure sensor 14 and secondary hydraulic pressure sensor 13 are read, and processing then goes to step S24.

In step S24, target deceleration Gcom of the vehicle is computed based on input rod stroke Xi, and processing then goes to step S25. Here, target deceleration Gcom has the characteristic that it increases as input rod stroke Xi increases.

In step S25, a judgment is made as to whether the regeneration coordination control is being carried out. If the judgment result is YES, processing goes to step S31. On the other hand, if the judgment result is NO, processing goes to step S26.

In step S26, a judgment is made as to whether master cylinder pressure Pmc is higher than a prescribed value. If the judgment result is YES, processing goes to step S27. On the other hand, if the judgment result is NO, processing goes to step S30. Here, the prescribed value refers to the master cylinder pressure when the change in master cylinder pressure Pmc is larger than the change in input rod stroke Xi.

In step S27, the last-cycle value Xb_Z of piston stroke Xb is subtracted from piston stroke Xb to compute piston stroke speed ΔXb to perform the function of detecting a speed of the assist member movement, and processing then goes to step S28.

In step S28, a judgment is made as to whether piston stroke speed ΔXb is lower than a prescribed value. This step comprises a steady state judgment device. If the judgment result is YES, processing goes to step S29. If the judgment result is NO, processing goes to step S30.

In step S29, starting regeneration coordination control is permitted, and processing then goes to step S31.

In step S30, starting regeneration coordination control is not permitted, and processing goes to step S31.

In step S31, piston stroke Xb is stored as last-cycle value Xb_Z, and processing then goes to return.

In Embodiment 1, when there is a changeover between regenerative braking torque and frictional braking torque, the relationship between piston stroke Xb and master cylinder pressure Pmc exhibits nonlinear characteristics, and variation occurs in brake depression force Fi caused by the linear characteristics of the relationship between piston stroke Xb and the reaction forces of springs 6d, 6e.

This problem becomes more significant in the region where change in master cylinder pressure Pmc with respect to change in piston stroke Xb is small. This occurs in a region where, for example, the reservoir port of master cylinder 2 is not closed or a region where master cylinder pressure Pmc varies but its gain is small)

Figure 8:
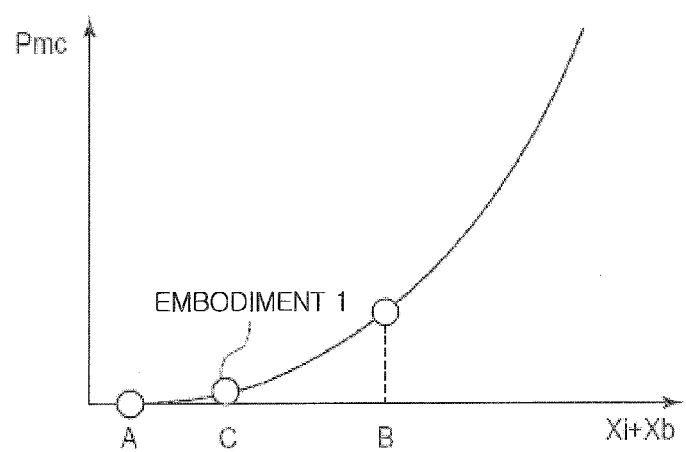
FIG. 8 is a graph illustrating the characteristics of the master cylinder pressure corresponding to the input rod stroke and the piston stroke.

As shown in FIG. 8, master cylinder pressure Pmc is generated in master cylinder pressure control mechanism 5 corresponding to the sum of input rod stroke Xi and piston stroke Xb. Here, if regeneration coordination control is started while input rod stroke Xi is in state A, and there is a changeover from regenerative braking torque to the frictional braking torque, piston stroke Xb must move from A to B. In the region from A to C, there is little change in master cylinder pressure Pmc with respect to piston stroke Xb. Consequently, while the reaction forces of springs 6d, 6e with respect to an increase in piston stroke Xb are small, brake depression force Fi decreases because the rise in master cylinder pressure Pmc is slow.

Figure 9:
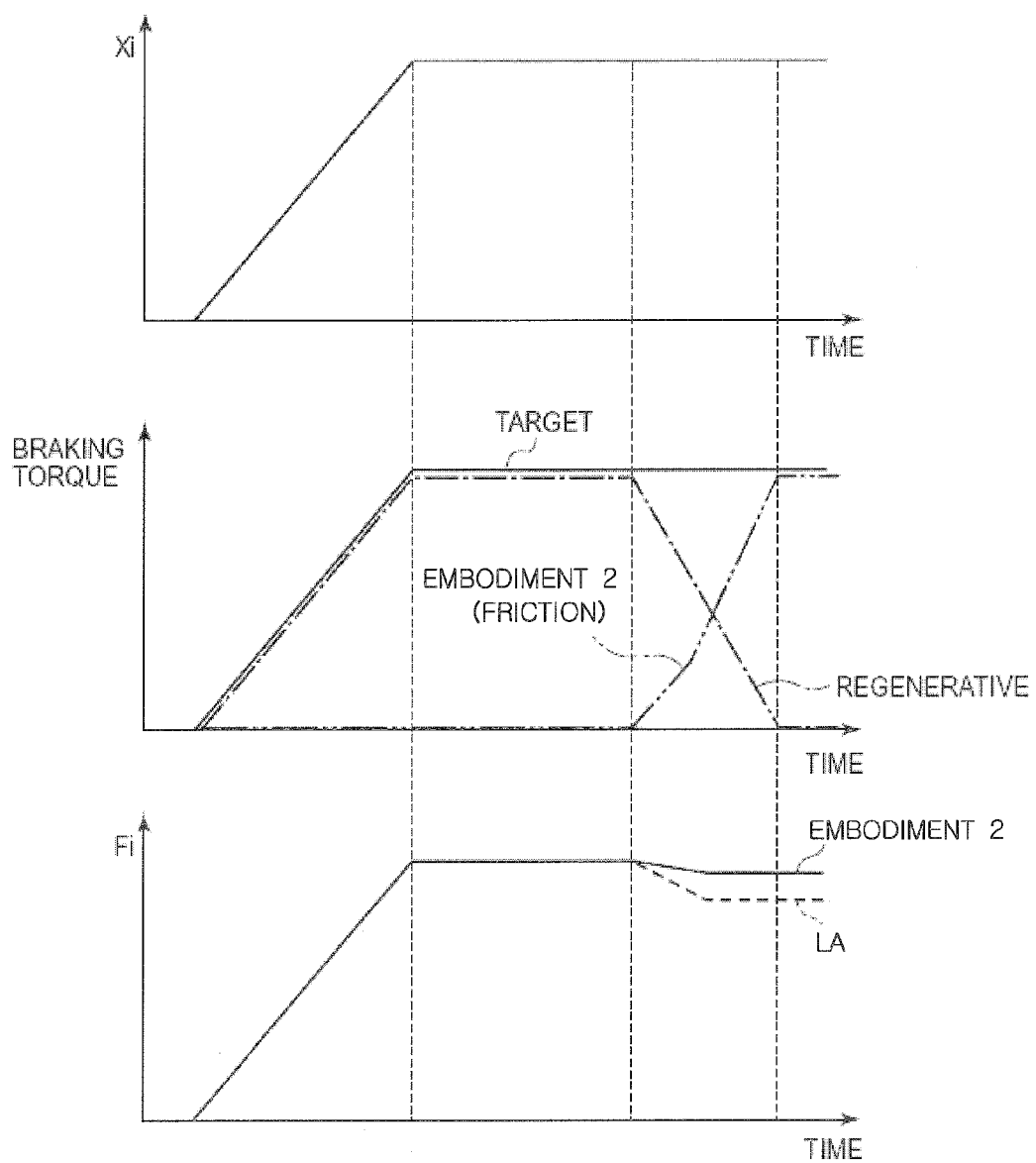
FIG. 9 is a time chart illustrating the judgment operation regarding starting regeneration coordination control according to the master cylinder pressure in Embodiment 2.

On the other hand, in Embodiment 2, when master cylinder pressure Pmc is in state C, regeneration coordination control is started. That is, the regeneration coordination control operation is started in the region where the change in master cylinder pressure Pmc is large with respect to piston stroke Xb. As a result, as shown in FIG. 9, unlike the case when this control is not adopted, which is represented by a dashed line LA in FIG. 9, delay in the rise of master cylinder pressure Pmc with respect to piston stroke Xb can be decreased, and it is possible to suppress the decrease in brake depression force Fi and variation in the target deceleration.

Figure 10:
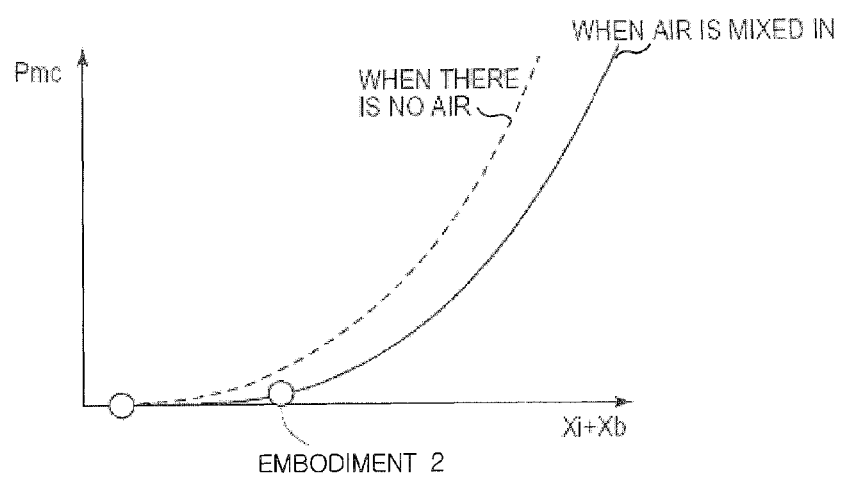
FIG. 10 is a graph illustrating deviation of the start position of the master cylinder pressure rise when air is mixed in the brake circuit.
Figure 11:
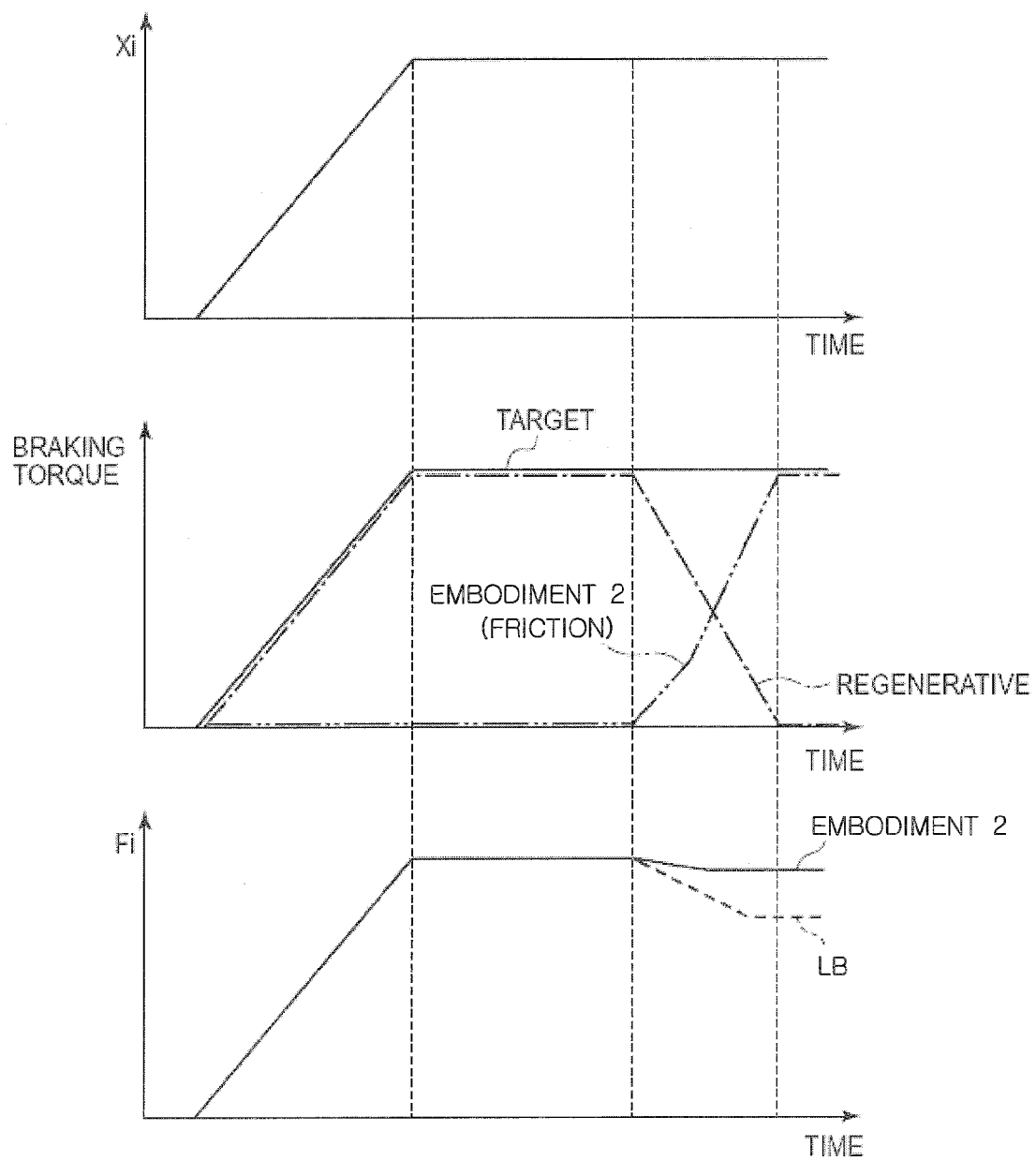
FIG. 11 is a time chart illustrating the judgment operation regarding starting regeneration coordination control according to the piston stroke speed in Embodiment 2.

In addition, if air is mixed in the brake circuit shown in FIG. 10, position (Xi+Xb) at the start of the rise in master cylinder pressure Pmc changes from that in the case when there is no air. That is, in FIG. 10, the dashed line represents a condition when air is not mixed in the brake circuit, while the solid line represents a condition when air is mixed in the brake circuit. As can be seen, when the scheme in Embodiment 2 is adopted, it is possible to start regeneration coordination control from the state of a well-established rise in master cylinder pressure Pmc with respect to change in piston stroke Xb, and significant improvement can be realized with regard to a decrease in brake depression force Fi. (See FIG. 11 where the dashed line LB represents a brake depression force condition when air is not mixed in the brake circuit and when this control is not adopted in contrast to the control in the second embodiment represented by the solid line.)

Figure 12:
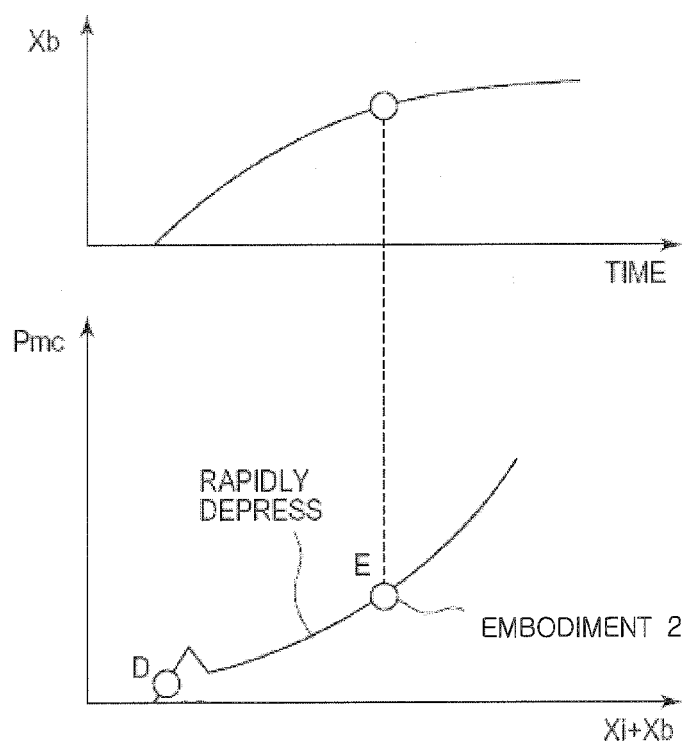
FIG. 12 is a graph illustrating the transient rise in the master cylinder pressure when there is a rapid depression of the brake pedal.

In Embodiment 2, when piston stroke speed $\Delta Xb$ is lower than a prescribed level, that is, when it is judged that the operation of primary piston 2b is in the steady state, regeneration coordination control is started. As shown in FIG. 12, if the driver rapidly depresses brake pedal BP, master cylinder pressure Pmc experiences a transient rise, and it then decreases. This is caused by the orifice behavior of the valve or the like arranged in the brake circuit.

In this case, if regeneration coordination control is started with only master cylinder pressure Pmc, regeneration coordination control starts at time D when master cylinder pressure Pmc experiences a transient rise. Consequently, since master cylinder pressure Pmc then decreases, brake depression force Fi significantly decreases.

Taking this problem into consideration, in Embodiment 2, the regeneration coordination control starts after it is judged that the operation of primary piston 2b is in the steady state so that the regeneration coordination control can be started at time E where change in master cylinder pressure Pmc becomes large with respect to change in piston stroke Xb. In this way, it is possible to suppress a decrease in brake depression force Fi when the brake pedal is rapidly depressed.

For the vehicle brake controller in Embodiment 2, in addition to effects (1), (2) of Embodiment 1, the following effects can also be realized.

(3) The vehicle brake controller is provided with primary hydraulic pressure sensor 14 and secondary hydraulic pressure sensor 13 for detecting master cylinder pressure Pmc, and regeneration coordination control is started by controller 110 when master cylinder pressure Pmc exceeds a prescribed level. As a result, it is possible to decrease the delay in the rise of master cylinder pressure Pmc with respect to piston stroke Xb, and a decrease in brake depression force Fi as well as variation in the target deceleration can be limited.

(4) The vehicle brake controller has a steady state judgment device (step S28) for judging whether the operation of the assist member is in the steady state. When the operation of primary piston 2b is judged to be in the steady state, controller 110 starts the regeneration coordination control. As a result, it is possible to start the regeneration coordination control in the region where the change in master cylinder pressure Pmc becomes large with respect to a change in piston stroke Xb, and it is possible to suppress the decrease in brake depression force Fi when the brake pedal is rapidly depressed.

(5) The vehicle brake controller has an assist member movement speed detector (step S27) for detecting piston stroke speed $\Delta Xb$, and when piston stroke speed $\Delta Xb$ is lower than a prescribed level, it is judged that the operation of primary piston 2b is in the steady state. As a result, it is possible to judge whether master cylinder pressure Pmc is transiently high.

Embodiment 3

Embodiment 3 differs from Embodiment 2 only with respect to the method for judging the steady state of the primary piston.

Figure 13:
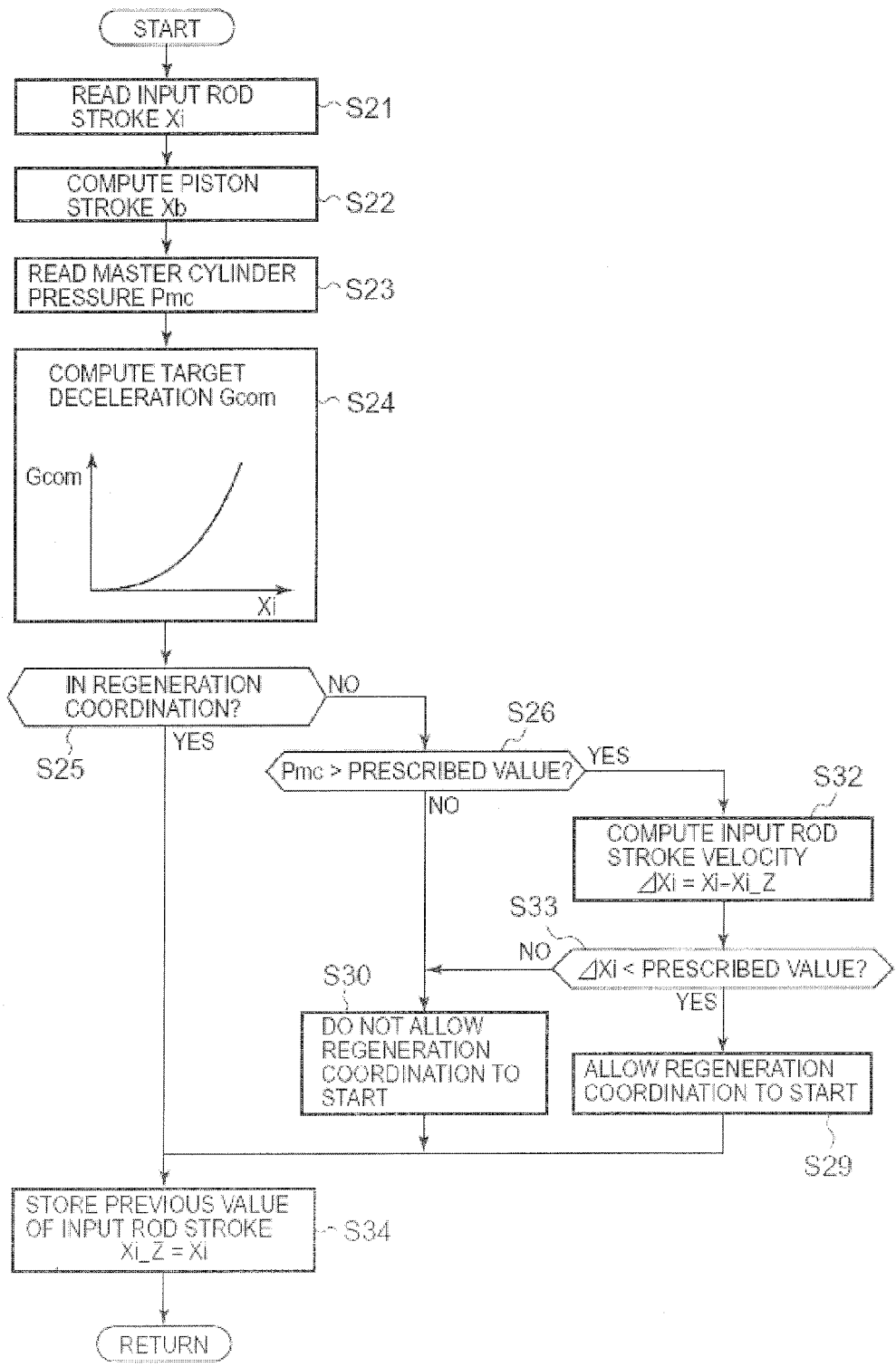
FIG. 13 is a flow chart illustrating the process of judging whether regeneration coordination control can be executed by an overall controller in Embodiment 3.

FIG. 13 is a flow chart illustrating the judgment processing as to whether regeneration coordination control can be executed by controller 110 in Embodiment 3. Many of the steps used above for Embodiment 1 and Embodiment 2 are adopted in Embodiment 3, so explanation of those steps will be omitted for the sake of brevity.

In step S32, last-cycle value Xi_Z of input rod stroke Xi is subtracted from input rod stroke Xi to compute change in input rod stroke $\Delta Xi$ that represents input rod stroke velocity information in the prescribed period between operation cycle of controller 110, and processing then goes to step S33. This step performs the function of detecting a speed of the input member movement.

In step S33, a judgment is made as to whether the change in input rod stroke $\Delta Xi$ is below a prescribed value. If the judgment result is YES, processing goes to step S29. On the other hand, if the judgment result is NO, processing goes to step S30. This step represents a steady state judgment device.

In step S34, input rod stroke Xi is stored as last-cycle value Xi_Z, and processing goes to return.

In Embodiment 3, a judgment is made as to whether the operation of primary piston 2b is in the steady state by comparing the change in input rod stroke ΔXi to a prescribed value. Because input rod 6 is connected to brake pedal BP, the change in input rod stroke ΔXi is equal to the depression speed of brake pedal BP. Here, when the depression speed of brake pedal BP is high, input rod stroke Xi according to it is required, so that it is possible to judge indirectly whether the operation of primary piston 2b is in the steady state.

For the vehicle brake controller in Embodiment 3, the following effects can be realized in addition to effects (1), (2) in Embodiment 1 and effects (3), (4) in Embodiment 2.

(6) The vehicle brake controller has an input member movement speed detector (step S32) for detecting the change in input rod stroke ΔXi, and when the change in input rod stroke ΔXi is below a prescribed value, the steady state judgment device (step S33) judges that the operation of primary piston 2b is in the steady state. As a result, it is possible to judge indirectly whether the operation of primary piston 2b is in the steady state.

Embodiment 4

Figure 14:
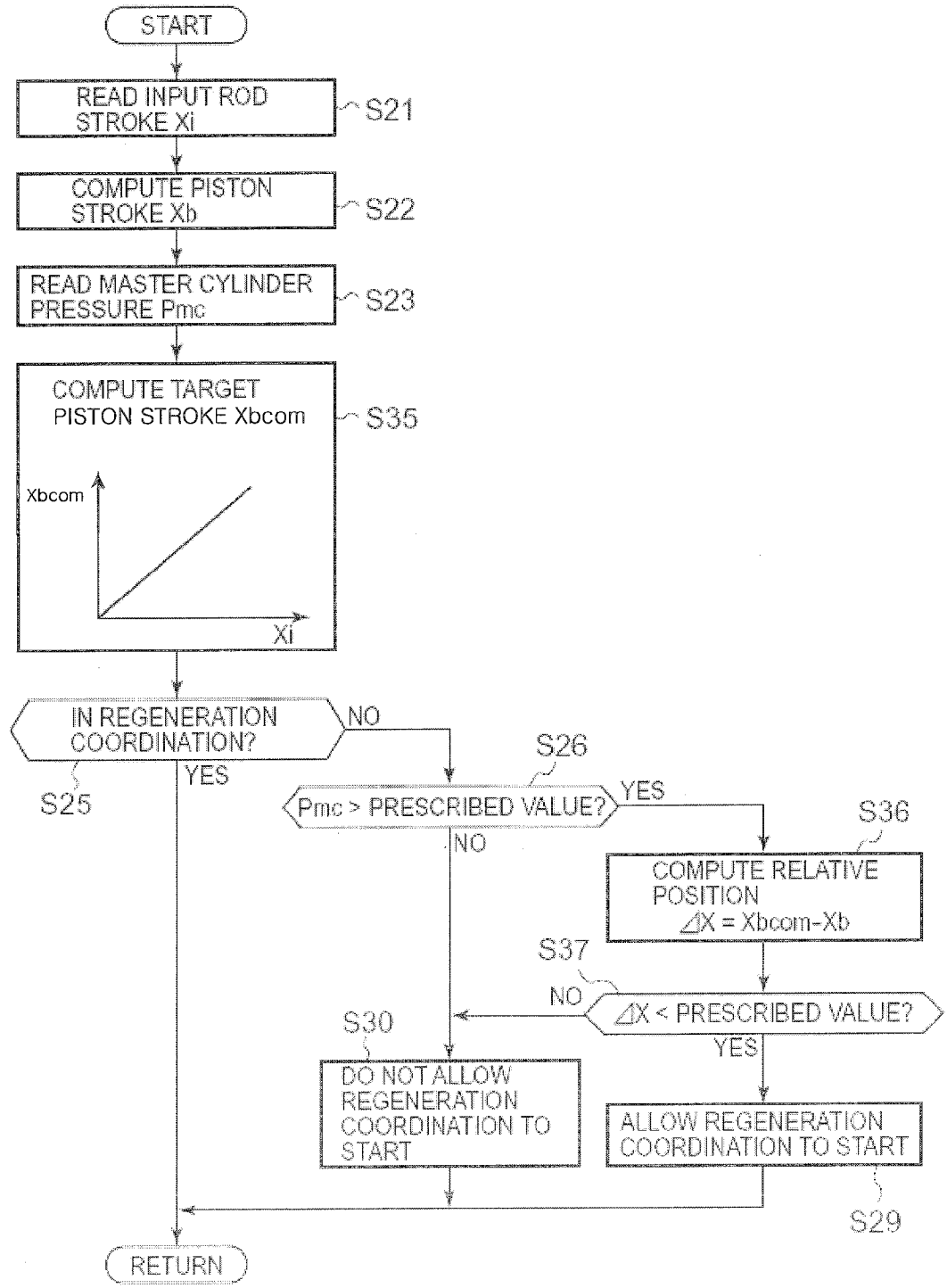
FIG. 14 is a flow chart illustrating the process of judging whether regeneration coordination control can be executed by an overall controller in Embodiment 4.

Embodiment 4 differs from Embodiment 2 only with regard to the method of judging the steady state of the primary piston. FIG. 14 is a flow chart illustrating the judgment processing in Embodiment 4 as to whether the regeneration coordination control executed by controller 110 is allowed. Many of the same steps used for Embodiment 1 and Embodiment 2 are adopted in Embodiment 4, so explanation of those steps will be omitted for the sake of brevity.

In step S35, target piston stroke Xbcom is computed based on input rod stroke Xi, and processing goes to step S25. Here, target piston stroke Xbcom has the characteristics with which the target deceleration Gcom is obtained based on input rod stroke Xi.

In step S36, piston stroke Xb is subtracted from target piston stroke Xbcom to compute relative position ΔX, and processing then goes to step S37.

In step S37, a judgment is made as to whether relative position ΔX is below a prescribed value. If the judgment result is YES, processing goes to step S29. If the judgment result is NO, processing goes to step S30. Step S37 is also called a steady state judgment device.

In Embodiment 4, judgment as to whether the operation of primary piston 2b is in the steady state is carried out by comparing relative position ΔX between target piston stroke Xbcom and input rod stroke Xi with a prescribed value. When brake pedal BP is depressed, taking into consideration the delay in response of the actuator (master cylinder pressure control mechanism 5), piston stroke Xb lags input rod stroke Xi.

Consequently, when the deviation (relative position ΔX) between target piston stroke Xbcom and piston stroke Xb is generated, the driver holds a state in which brake pedal BP is further depressed, or the driver holds brake pedal BP steady. It can be seen that piston stroke Xb can catch up with target piston stroke Xbcom. That is, when relative position ΔX between target piston stroke Xbcom and piston stroke Xb is smaller than a prescribed value, it can be judged that the operation of depressing the pedal and the operation of primary piston 2b are in the steady state.

For the vehicle brake controller in Embodiment 4, the following effects can be realized in addition to effects (1), (2) of Embodiment 1 and effects (3), (4) of Embodiment 2.

(7) When relative position ΔX between target piston stroke Xbcom and actual piston stroke Xb is smaller than a prescribed value, it is judged by the steady state judgment device (step S37) that the operation of primary piston 2b is in the steady state. As a result, it can be judged that the pedal operation and the operation of primary piston 2b are in the steady state.

In the above, the brake booster controller of the present invention has been explained with reference to embodiments. However, the invention is not limited to the described embodiments. Various modifications or additions to the design can be adopted.

For example, the brake booster is not limited to that disclosed in the embodiments. The present invention can be adopted, with the same operation and effects as those in the described embodiments, in any brake booster with the following features. Namely, it has an input member that moves forward/backward as the brake pedal is depressed/released, an assist member that can move relative to the input member in the movement direction of the input member, a biasing member that biases the input member with respect to the assist member toward the neutral position of relative displacement between the two parts and an actuator that drives the assist member to move forward/backward according to the displacement of the input member. Further, it should generate brake fluid that boosts the driving force of the assist member in a master cylinder.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A vehicle brake controller for a vehicle having a brake pedal and a plurality of wheels comprising:
   a master cylinder housing a brake fluid at a master cylinder brake pressure level;
   an input member that moves within a master cylinder responsive to movement of the brake pedal to adjust the master cylinder brake pressure level;
   an assist member that moves within the master cylinder independent of but relative to the input member to further adjust the master cylinder brake pressure level;
   a biasing member that biases the assist member and the input member to have a prescribed relative position relationship;
   a motor that applies a driving force to the assist member to move relative to the input member based on displacement of the input member;
   a braking force booster that boosts the driving force of the assist member in the master cylinder;
   a frictional braking device that applies a frictional braking torque to each wheel according to the master cylinder brake pressure level;
   a regenerative braking device that applies a regenerative braking torque to each wheel;
   a regenerative braking torque change rate detector that detects a rate of change of the regenerative braking torque;
   a regeneration coordination controller that executes a regeneration coordination control operation to control the frictional braking torque and the regenerative braking torque so that the total braking torque meets a braking torque demand, the total braking torque including the frictional braking torque and the regenerative braking torque; and
   an assist driving force corrector that corrects displacement of the assist member with respect to the displacement of the input member according to the rate of change of the regenerative braking torque during the regeneration coordination control operation.

2. The vehicle brake controller described in claim 1 wherein:
the assist driving force corrector corrects the displacement of the assist member with respect to the displacement of the input member such that the displacement of the assist member is decreased when the rate of change in the regenerative braking torque is higher.

3. The vehicle brake controller described in claim 1 wherein:
the assist driving force corrector corrects the displacement of the assist member with respect to the displacement of the input member by correcting a target deceleration based on the rate of change in the regenerative braking torque.

4. The vehicle brake controller described in claim 1 further comprising:
a pedal stroke speed detector that detects a stroke speed of the brake pedal; and
wherein the assist driving force corrector further increases the displacement of the assist member with respect to the displacement of the input member when the stroke speed of the brake pedal is higher.

5. The vehicle brake controller described in claim 1 further comprising:
a master cylinder pressure detector that detects the master cylinder pressure level; and
wherein the regeneration coordination controller starts the regeneration coordination control operation when the detected master cylinder pressure exceeds a prescribed level.

6. The vehicle brake controller described in claim 5 further comprising:
a steady state judgment device that judges whether the operation of the assist member is in a steady state; and
wherein the regeneration coordination controller starts the regeneration coordination control operation when it is judged that an operation of the assist member is in a steady state.

7. The vehicle brake controller described in claim 6 further comprising:
an assist member movement speed detector that detects a movement speed of the assist member; and
wherein the steady state judgment device judges that the operation of the assist member is in the steady state when the movement speed of the assist member is lower than a prescribed level.

8. The vehicle brake controller described in claim 6 further comprising:
an input member movement speed detector that detects a movement speed of the input member; and
wherein the steady state judgment device judges that the operation of the assist member is in the steady state when the movement speed of the input member is lower than a prescribed level.

9. The vehicle brake controller described in claim 6 wherein:
the steady state judgment device computes a target displacement of the assist member based on the displacement of the input member; and
the steady state judgment device judges that the operation of the assist member is in the steady state when a difference between the target displacement of the assist member and the displacement of the assist member is smaller than a prescribed value.

10. The vehicle brake controller described in claim 1, further comprising:
an input member displacement sensor for detecting the displacement of the input member; and
an assist member displacement sensor for detecting the displacement of the assist member.

11. A vehicle brake controller for a vehicle having a brake pedal and a plurality of wheels comprising:
master cylinder housing a brake fluid at a master cylinder brake pressure amount;
first means for adjusting the master cylinder brake pressure level by movement within the master cylinder responsive to movement of the brake pedal;
second means for adjusting the master cylinder brake pressure level by movement within the master cylinder independent of but relative to the first means;
means for biasing the first means and the second means in a prescribed relative position relationship;
driving means for applying a driving force to the second means to move the second means relative to the first means based on displacement of the first means;
braking force boosting means for boosting the driving force of the second means in the master cylinder;
frictional braking means for applying a frictional braking torque to each wheel according to the master cylinder brake pressure level;
regenerative braking means for applying a regenerative braking torque to each wheel;
regenerative braking torque change rate detection means for detecting a rate of change of the regenerative braking torque;
regeneration coordination control means for executing a regeneration coordination control operation to control the frictional braking torque and the regenerative braking torque so that the total braking torque meets a braking torque demand, the total braking torque including the frictional braking torque and the regenerative braking torque; and
assist driving force correction means for correcting displacement of the second means with respect to the displacement of the first means according to the rate of change of the regenerative braking torque during the regeneration coordination control operation.

* * * * *